(12) United States Patent
Lee et al.

(10) Patent No.: US 9,519,350 B2
(45) Date of Patent: *Dec. 13, 2016

(54) INTERFACE CONTROLLING APPARATUS AND METHOD USING FORCE

(71) Applicant: SAMSUNG ELECTRONICS CO., LTD., Suwon-si, Gyeonggi-do (KR)

(72) Inventors: Bho Ram Lee, Seongnam-si (KR); Joon Ah Park, Seoul (KR); Hyun Jeong Lee, Hwaseong-si (KR); Soo Chul Lim, Seoul (KR); Hyung Kew Lee, Gunpo-si (KR); Seung Ju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

This patent is subject to a terminal disclaimer.

(21) Appl. No.: 14/017,694

(22) Filed: Sep. 4, 2013

(65) Prior Publication Data

US 2014/0002355 A1 Jan. 2, 2014

(30) Foreign Application Priority Data

Sep. 19, 2011 (KR) .................. 10-2011-0094154

(51) Int. Cl.
| | |
|---|---|
| G06F 3/041 | (2006.01) |
| G06F 3/01 | (2006.01) |
| G06F 1/16 | (2006.01) |
| G06F 3/0482 | (2013.01) |
| G06F 3/0483 | (2013.01) |

(Continued)

(52) U.S. Cl.
CPC ............. *G06F 3/017* (2013.01); *G06F 1/1626* (2013.01); *G06F 1/1694* (2013.01); *G06F 3/03548* (2013.01); *G06F 3/0414* (2013.01); *G06F 3/0482* (2013.01); *G06F 3/0483* (2013.01); *G06F 3/04847* (2013.01); *G06F 2203/04105* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 2006/0197753 A1* | 9/2006 | Hotelling | ................. 345/173 |
| 2007/0055410 A1* | 3/2007 | Morohoshi | ................. 700/302 |
| 2007/0256547 A1 | 11/2007 | Feeney et al. | |

(Continued)

FOREIGN PATENT DOCUMENTS

| | | |
|---|---|---|
| JP | 2010-113445 | 5/2010 |
| JP | 2011-065512 | 3/2011 |

(Continued)

OTHER PUBLICATIONS

Jun Rekimoto et al., "PreSenseII: Bi-directional Touch and Pressure Sensing Interactions with Tactile Feedback", *CHI 2006*, Apr. 22-17, 2006, 6 pp.

(Continued)

*Primary Examiner* — Viet Pham
*Assistant Examiner* — Christopher Kohlman
(74) *Attorney, Agent, or Firm* — NSIP Law

(57) ABSTRACT

An interface controlling apparatus and method may generate content control information by analyzing force input information received from at least one force sensor, and may control content based on the content control information.

49 Claims, 45 Drawing Sheets

(51) Int. Cl.
*G06F 3/0484* (2013.01)
*G06F 3/0354* (2013.01)

(56) References Cited

U.S. PATENT DOCUMENTS

| | | | |
|---|---|---|---|
| 2008/0170043 A1* | 7/2008 | Soss et al. | 345/173 |
| 2008/0259046 A1* | 10/2008 | Carsanaro | 345/173 |
| 2009/0160781 A1* | 6/2009 | Henderson et al. | 345/173 |
| 2009/0256807 A1* | 10/2009 | Nurmi | G06F 3/0338 |
| | | | 345/173 |
| 2010/0052880 A1 | 3/2010 | Laitinen et al. | |
| 2010/0128002 A1 | 5/2010 | Stacy et al. | |
| 2010/0271312 A1* | 10/2010 | Alameh et al. | 345/173 |
| 2010/0277432 A1 | 11/2010 | Tsai | |
| 2010/0321319 A1 | 12/2010 | Hefti | |
| 2011/0012921 A1 | 1/2011 | Cholewin et al. | |
| 2011/0050594 A1* | 3/2011 | Kim et al. | 345/173 |
| 2011/0057886 A1 | 3/2011 | Ng et al. | |
| 2011/0057899 A1* | 3/2011 | Sleeman | G01L 1/146 |
| | | | 345/174 |
| 2011/0211131 A1* | 9/2011 | Kikuchi et al. | 348/734 |
| 2011/0248931 A1* | 10/2011 | Shenfield et al. | 345/173 |
| 2012/0068929 A1* | 3/2012 | Kim | G06F 3/0338 |
| | | | 345/163 |
| 2012/0075241 A1 | 3/2012 | Bao et al. | |
| 2012/0105358 A1* | 5/2012 | Momeyer et al. | 345/174 |
| 2012/0260220 A1* | 10/2012 | Griffin | 715/863 |
| 2013/0018489 A1* | 1/2013 | Grunthaner et al. | 700/73 |

FOREIGN PATENT DOCUMENTS

| | | |
|---|---|---|
| JP | 2011-100385 | 5/2011 |
| JP | 2011-107738 | 6/2011 |
| KR | 10-1999-0064226 | 7/1999 |
| KR | 10-2003-0090732 | 11/2003 |
| KR | 10-2007-0039868 | 4/2007 |
| KR | 10-2009-0028344 | 3/2009 |
| KR | 10-2009-0037652 | 4/2009 |
| KR | 10-2010-0015231 | 2/2010 |
| KR | 10-2010-0018883 | 2/2010 |
| KR | 10-2010-0066036 | 6/2010 |
| KR | 10-2010-0068393 | 6/2010 |
| KR | 10-2010-0090584 | 8/2010 |
| KR | 10-2010-0126905 | 12/2010 |
| KR | 10-2011-0020522 | 3/2011 |
| KR | 10-2011-0030427 | 3/2011 |

OTHER PUBLICATIONS

Craig Stewart et al., "Characteristics of Pressure-Based Input for Mobile Devices", *CHI 2010: Tactile Interaction*, Apr. 10-15, 2010, pp. 801-810.

U.S. Appl. No. 13/447,671, filed Apr. 16, 2012, Bho Ram Lee et al., Samsung Electronics Co., Ltd.

United States Office Action issued on Dec. 1, 2014 in Parent U.S. Appl. No. 13/447,671 (41 pages, in English).

Office Action mailed Dec. 19, 2013 in related U.S. Appl. No. 13/447,671.

Office Action mailed Jul. 30, 2014 in related U.S. Appl. No. 13/447,671.

* cited by examiner

INTERFACE CONTROLLING APPARATUS AND METHOD USING FORCE

CROSS-REFERENCE TO RELATED APPLICATIONS

This application is a Continuation-in-Part of application Ser. No. 13/447,671, filed on Apr. 16, 2012, which claims the priority benefit of Korean Patent Application No. 10-2011-0094154, filed on Sep. 19, 2011, in the Korean Intellectual Property Office, whose priority is equally claimed for the present application, with the respective disclosures being incorporated herein by reference.

BACKGROUND

1. Field

The following description relates to an interface controlling apparatus and method using force.

2. Description of the Related Art

A general user interface control technology may employ a method of inputting a control signal by controlling pre-configured hardware such as a keyboard, a joystick, or a button, for example, by using a detected user gesture such as a contact of a user with a device, for example, or by using observed spatial kinematic and action information of the user.

The detection of the user gesture may include generating direction information based on a determined spatial movement of the user. For example, a gesture of searching a large map image for a region of interest or a gesture of moving contact coordinates, e.g., touch screen coordinates where a user's touch is detected, to scroll a long webpage.

In the case of a general input device, the physically contactable space range is limited and thus, a user may need to repeat a gesture in order to step-wise navigate through a large virtual workspace.

The observation of the spatial kinematic and action information of the user may be performed within a physical space that is available for observing an actual input and mapping the actual input value. However, this physical space may be limited and thus, observed motions of the user and the observing input device may limit user interaction.

In general, the method of inputting the control signal by controlling the preconfigured hardware, by using the user gesture, or by using the spatial kinematic and action information of the user may visually disclose an input behavior without a separate action.

SUMMARY

One or more embodiments provide an interface controlling system, the system including an information receiver to receive, from at least one force sensor, at least one lateral force input information relative to a contact surface of the system and associated with at least one input force, an information analyzer to generate content control information by analyzing the lateral force input information, and a content controller to control content, for provision to a user, based on the content control information.

One or more embodiments provide an interface controlling system, the system including a contact unit having flexibility to receive at least one lateral force input information relative to a contact surface of the contact unit, a base disposed on one surface of the contact unit to receive the contact unit, a sensing unit including at least one force sensor to measure the at least one lateral force input information received from the contact unit, and a content controller to generate content control information by analyzing the measured at least one lateral force input information, and to control content, for provision to a user, based on the generated content control information.

One or more embodiments provide an interface controlling system, including a contact unit having flexibility to receive lateral force input information relative to a contact surface of the contact unit, a sensing unit disposed along one lateral surface of the contact unit, and provided with at least one force sensor to measure the lateral force input information received from the contact unit, and a content controller to generate content control information by analyzing a direction of the measured lateral force input information, and to control content based on the content control information.

One or more embodiments provide an interface controlling method, the method including receiving, from at least one force sensor, at least one force input information associated with at least one input force that is applied to a contact surface, the at least one force input information being at least one lateral force input information relative to the contact surface, generating content control information by analyzing the at least one lateral force input information, and controlling content, for provision to a user, based on the content control information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
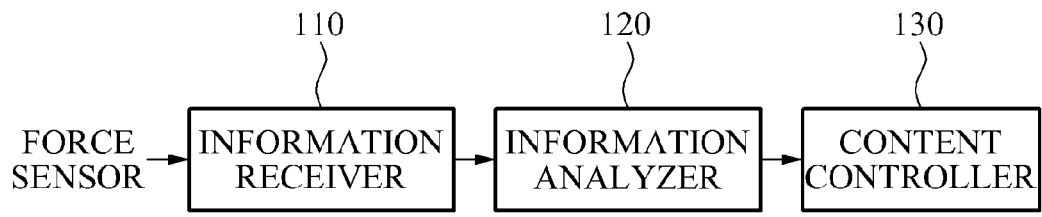
FIG. 1 and FIG. 2 illustrate a configuration of an interface controlling apparatus using a force, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

An interface controlling apparatus according to one or more embodiments relates to using, as input information, a force that is applied from a user, and to receiving, as the input information, the force as applied to a contact surface, e.g., a direction parallel to the contact surface, and to generating content control information.

An interface used herein, according to one or more embodiments, may enable a user to interact with a portable terminal, and may include content that provides information associated with a variety of application programs operating on the portable terminal, for example.

Also, content used herein, according to one or more embodiments, may indicate any type of graphical element that may be displayed on a display screen and which may be selected by a user, or a configuration that is operable in a background of an application program, as only examples. When input information associated with a predetermined content object is received, a predetermined process connected with the content object may be executed. A content object according to one or more embodiments is to be understood as having the broadest meaning of a concept that includes a virtual space, a virtual object, a text, an image, a file, a folder, a window, a web, or an application, or an icon, a menu button, a tool button, and various types of hyperlinks associated therewith, and the like, as only examples.

A terminal may be included in a system, according to one or more embodiments, that also includes an interface controlling apparatus, and the system may be any information communication device and/or multimedia device, for example, a television (TV), a set-top box, a mobile communication terminal, a digital broadcasting terminal, a personal digital assistant (PDA), a smart phone, an international mobile telecommunication (IMT)-2000 terminal, a wideband code division multiple access (WCDMA) terminal, a universal mobile telecommunication service (UMTS) terminal, and the like, and applications thereof.

Figure 2:
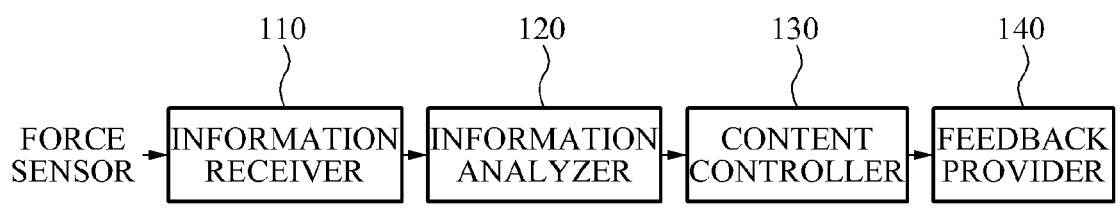

FIG. 1 and FIG. 2 illustrate a configuration of an interface controlling apparatus using a force, according to one or more embodiments.

Referring to FIG. 1, the interface controlling apparatus may include an information receiver 110, an information analyzer 120, and a content controller 130, for example.

The information receiver 110 may receive force input information associated with at least one input force from each of at least one force sensor. The force input information may include at least one of an action point of force that is input to the at least one force sensor, a direction of force, a magnitude of force, and a time duration of force.

The information analyzer 120 may generate content control information by analyzing the force input information. The information analyzer 120 may determine whether the force input information is greater than a reference value set to control the content, and may generate the content control information when the force input information is greater than the reference value.

The content controller 130 may control content based on the content control information. The content controller 130 may control content that includes a virtual space, a virtual object, a text, an image, a file, a folder, a window, a web, or an application, or an icon, a menu button, a tool button, and various types of hyperlinks associated therewith, and the like, as only examples.

The information receiver 110 may receive at least one other item of input information, and the information analyzer 120 may generate the content control information based on the force input information and the at least one other item of input information. As only an example, the at least one other item of input information may include at least one of contact input information, acceleration information, angular velocity information, and geomagnetic information, as only examples.

The information analyzer 120 may generate the content control information based on the force input information and the contact input information. The content controller 130 may determine a target of the content based on the contact input information and may control the determined target based on the force input information.

The information analyzer 120 may generate the content control information based on the force input information with at least one of the acceleration information, the angular velocity information, and the geomagnetic information, for example. The content controller 130 may move a target of the content based on at least one of the acceleration information, the angular velocity information, and the geomagnetic information, and may change a size of the target based on the force input information.

The information analyzer 120 may generate the content control information used to determine a scroll direction of a visible area of the content based on the force input information. The content controller 130 may scroll the visible area of the content based on the content control information.

The information analyzer 120 may generate the content control information used to control a visible area of the content to be enlarged or reduced based on a combination of the force input information, e.g., based on different measurable aspects of the applied force(s). The content controller 130 may enlarge or reduce the visible area of the content based on the content control information. In such an example, the content control information may include information associated with an enlargement rate or a reduction rate of the visible area based on a magnitude of force included in the force input information.

The information analyzer 120 may generate the content control information used to determine a selection area with respect to a menu, a folder, or a file of the content, as only examples, based on the force input information. The content controller 130 may determine the selection area with respect to such a menu, folder, or file of the content based on the content control information.

The information analyzer 120 may generate the content control information used to determine an upper area or a lower area with respect to a menu, a folder, or a file of the content, again as only examples, based on a combination of the force input information. The content controller 130 may determine the upper area or the lower area with respect to such a menu, folder, or file of the content based on the content control information.

The information analyzer 120 may generate the content control information used to determine a search direction or a search section with respect to multimedia of the content based on the force input information. The content controller 130 may determine the search direction or the search section with respect to such multimedia of the content based on the content control information.

The information analyzer 120 may generate the content control information used to determine a previous file or a subsequent file, for example, with respect to multimedia of the content based on a combination of the force input information. The content controller 130 may determine such a previous file or subsequent file with respect to the multimedia of the content based on the content control information.

The information analyzer 120 may generate the content control information used to determine a page turning direction, for example, with respect to multimedia of the content based on the force input information. The content controller 130 may determine such a page turning direction with respect to the multimedia of the content based on the content control information.

The information analyzer 120 may generate the content control information used to control a front page or a last page, for example, of the content to be displayed based on a combination of the force input information. The content controller 130 may control such a front page or last page of the content to be displayed based on the content control information.

Such aforementioned examples of the interface controlling apparatus, according to one or more embodiments, will be further described with reference to FIG. 34 through FIG. 56.

Referring to FIG. 2, the interface controlling apparatus may control content and may further include a feedback provider 140 to provide feedback to a user, according to one or more embodiments.

The feedback provider 140 may provide, to the user, a modality such as visual sense, auditory sense, or haptic sense, as only examples. Feedback to be provided using such a visual sense may be provided through flickering of a lighting apparatus, for example, and feedback to be provided using such an auditory sense may be provided through a haptic apparatus such as an actuator or a motor, for example.

Figure 3:
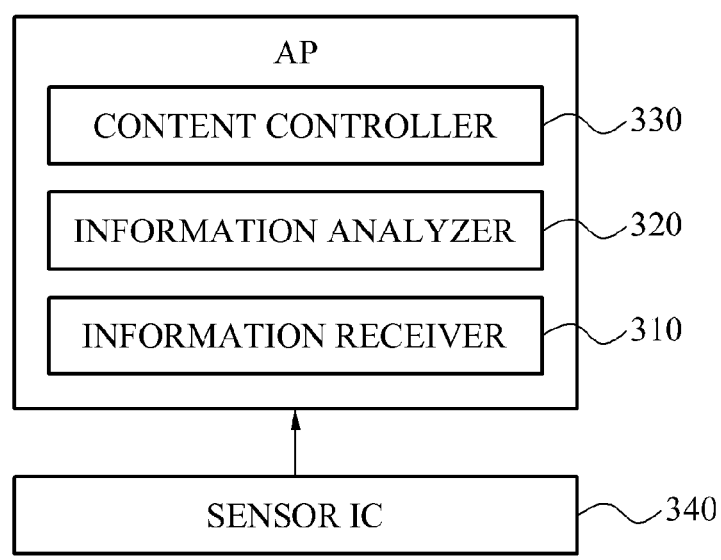
FIG. 3 illustrates a configuration of an interface controlling apparatus using a force, according to one or more embodiments.

FIG. 3 illustrates a configuration of an interface controlling apparatus using a force, according to one or more embodiments.

Referring to FIG. 3, the interface controlling apparatus may include a sensor integrated chip (IC) 340 and an application processor (AP), as only examples.

The sensor IC 340 may recognize at least one force input that is input from a touch screen, a touch pad, or a home button, for example. The sensor IC 340 may store, in a memory, input information corresponding to a force sensor of the sensor IC 340 and an event corresponding to a detected sensor input. In this example, the input information corresponding to the force sensor may indicate a position or coordinates of force or an index of a force sensor that corresponds to a target.

The AP may generate content control information by analyzing the input information and the event that are recognized by the sensor IC 340, and may control content based on the content control information. For the above operation, the AP may include an information receiver 310, an information analyzer 320, and a content controller 330, for example.

The information receiver 310 may receive, from at least one force sensor, force input information associated with at least one input force. The information analyzer 320 may generate content control information by analyzing the force input information. The content controller 330 may control content based on the generated content control information.

Figure 4:
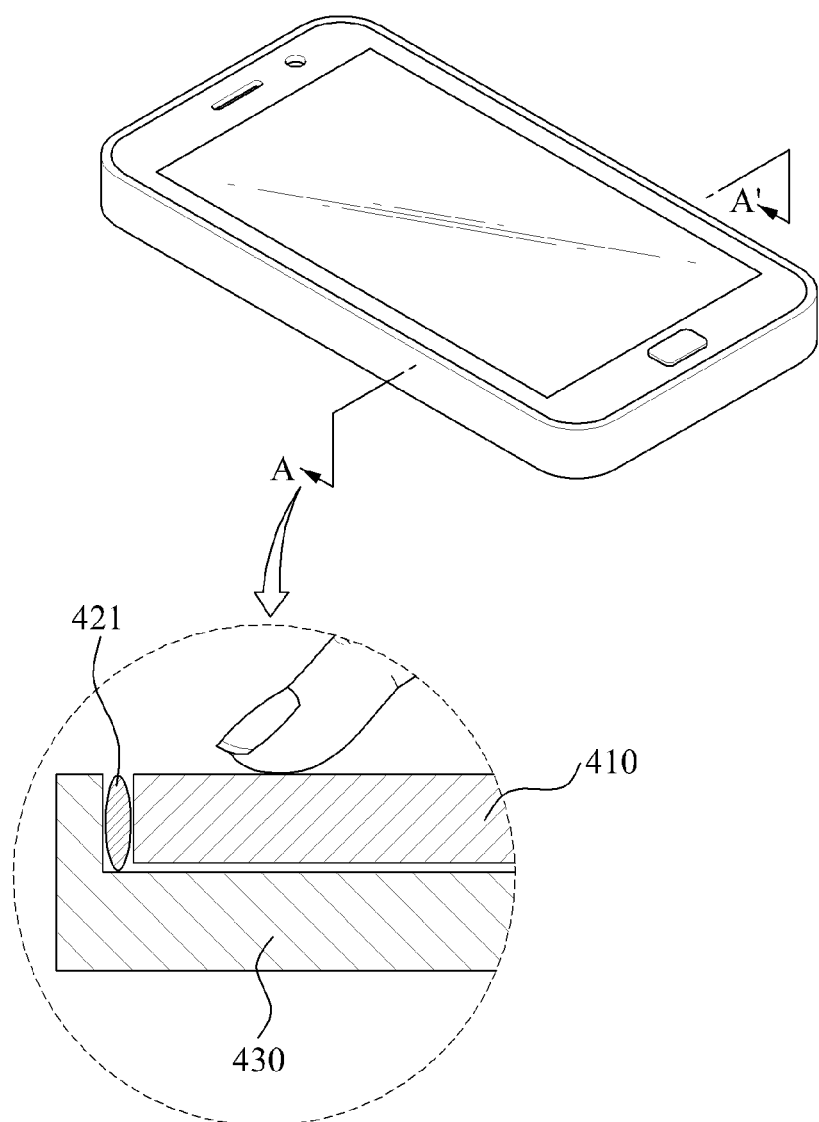
FIG. 4 illustrates a side-cross sectional view of an interface controlling apparatus using a force, according to one or more embodiments.

FIG. 4 illustrates a side-cross sectional view of an interface controlling apparatus using a force, according to one or more embodiments.

Referring to FIG. 4, the interface controlling apparatus may include a contact unit 410 having flexibility to receive force input information, a sensing unit disposed on at least one surface of the contact unit 410, and provided with at least one respective force sensor 421 on a base 430 to measure the force input information received from the contact unit 410, and a content controller of the interface controlling apparatus may generate content control information by analyzing the measured force input information, and control content based on the content control information.

The interface controlling apparatus may be employed as a form of a touch screen or a touch pad. In this example, a display unit of such a system including the interface controlling apparatus, according to one or more embodiments, may display content to a user, e.g., based on control by the content controller of the system.

The contact unit 410 may be a member configured to receive, e.g., from a pointing object, force input information corresponding to a position of content or a control command with respect to the content, and may be configured with a material restorable to an original shape in order to receive force input information of the user, e.g., for a subsequent force input. In one or more embodiments, one surface of the contact unit 410 may be a surface disposed to face the user and configured to receive force input information from such a pointing object.

The pointing object may be one of a finger, a touch input pen, and an input button, as only example, and/or a home button of a corresponding mobile communication terminal, according to one or more embodiments, including at least one button or key for a directional input, noting that embodiments are not limited thereto. Accordingly, the pointing object may include any configuration capable of generating force input information corresponding to a position of content or a control command with respect to the content.

Depending on embodiments, the contact unit 410 may be inserted into a lower portion of a display unit of the touch screen or the touch pad, may be inserted into a lower portion of a force input key or a force input button for force input, such as a home button of a mobile device, for example, or may be inserted into an integrated or divided Qwerty keyboard, noting that alternatives are also available.

Depending on embodiments, the contact unit 410 may be used together with a physical module configured to provide a predetermined function, such as a physical module for transferring force input information, a liquid crystal display (LCD), an organic light emitting diode (OLED), electronic paper, or a display device including a flexible display, as only examples. Also, the contact unit 410 may be used together with an independent system, such as a physical module configured to sense input information associated with a temperature, pressure, or magnetic field, for example, excluding a force, or a mobile telephone, for example.

The sensing unit may include at least one force sensor 421, e.g., formed on one surface of the contact unit 410 and configured to measure force input information received from the contact unit 410, and a base 430 formed with the at least one force sensor 421 on one surface of the base 430. The base 430 may include an uneven portion disposed on one surface of the contact unit 410 to receive the contact unit 410. The base 430 may include the at least one force sensor 421 formed on one side of the contact unit 410 to measure force input information received from the contact unit 410.

A force sensor 421 may be disposed in an opening that is formed between the base 430 and the contact unit 410, for example, and may be formed along the circumference of the contact unit 410 to efficiently receive force input information from the contact unit 410.

The force sensor 421 may detect a magnitude of force acting using a contact resistance scheme, a capacitance scheme, or a piezoelectric scheme, as only examples. The force sensor 421 may include various sensors of which states vary due to applied force. The force sensor 421 may be, as only examples, a sensor of a physical state such as a resistance value, capacitance, voltage, magnetic field, optical wavelength, density, temperature, or volume, for example, and capable of detecting a measurement value based on the varying physical states, noting that alternatives are available.

The content controller may generate content control information by analyzing the measured force input information, and may control the content based on the generated content control information. In one or more embodiments, a configuration of a interface controlling apparatus, or system including the same, and operations of analyzing of the force input information and controlling the content have been described above with reference to FIG. 1 through FIG. 3, and thus, a further detailed description will be omitted. Hereinafter, a configuration and a combination of the contact unit 410 and the sensing unit, according to one or more embodiments, will be further described with reference to FIG. 5 through FIG. 10.

FIG. 5 through FIG. 8 illustrate side-cross sectional views of an interface controlling apparatus based on a combination of the contact unit 410 and the sensing unit, according to one or more embodiments.

The contact unit 410 may be a member that is configured to receive, from a pointing object, force input information corresponding to a position of content, e.g., which is being displayed to a user, or a control command with respect to the content. The base 430 may include an uneven portion disposed on one surface of the contact unit 410 to receive the contact unit 410. The base 430 may include at least one force sensor 421 formed on one side of the contact unit 410 to measure force input information received from the contact unit 410.

A force sensor 421 may be disposed in an opening that is formed between the base 430 and the contact unit 410, and may be, depending on embodiment, formed along the circumference of the contact unit 410 to efficiently receive force input information from the contact unit 410.

According to one or more embodiments, the interface controlling apparatus may further include a buffering unit 422 disposed between the contact unit 410 and the force sensor 421 to transfer, to the force sensor 421, the force input information received from the contact unit 410.

The buffering unit 422 may be configured to transfer, to the force sensor 421, force input information that is input from the pointing object to the contact unit 410, and to enable the transfer of the force to be uniformly formed, for example. For such a configuration, the buffering unit 422 may be an elastic material, noting that alternatives are available.

Figure 5:
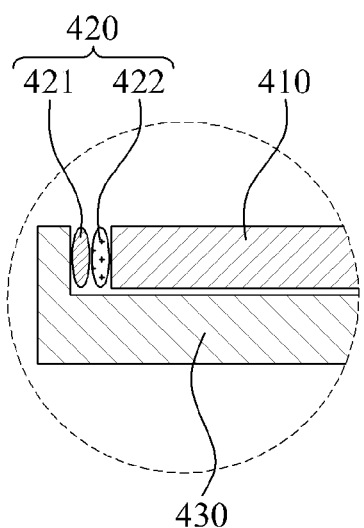
FIG. 5 through FIG. 8 illustrate side-cross sectional views of an interface controlling apparatus based on a combination of a contact unit and a sensing unit, according to one or more embodiments.
Figure 6:
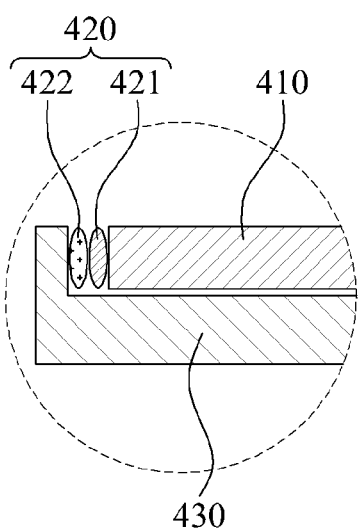

Depending on embodiments, the buffering unit 422 of FIG. 5 may be configured to contact with the contact unit 410, and to transfer force input information to the force sensor 421. The buffering unit 422 of FIG. 6 may be configured to contact with a side surface of the base 430 and to buffer force input information that is transferred from the force sensor 421.

Figure 7:
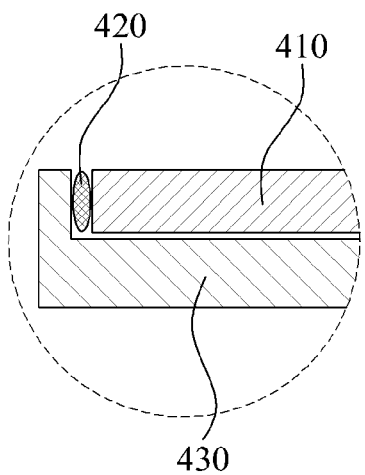

Depending on embodiments, referring to FIG. 7, the force sensor 421 may be configured as a sensor 420 formed using an elastic material in order to readily measure force input information received from the contact unit 410, and to easily transfer force. That is, the sensor 420 may have a mixed structure which includes the force sensor 421 and the buffering unit 422, e.g., disposed between the contact unit 410 and the base 430 to buffer and measure the force input information.

Figure 8:
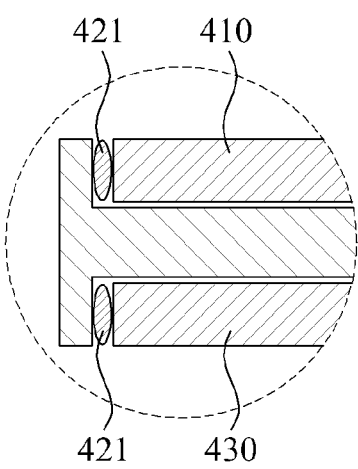

Referring to FIG. 8, the interface controlling apparatus may include the contact unit 410 formed in a structure of at least one layer that is supported by the base 430. In this example, at least one force sensor 421 may be disposed in an opening that is formed between the base 430 and the contact unit 410 that is formed in the structure of at least one layer. To efficiently receive force input information from the contact unit 410, the at least one force sensor 421 may be formed along the circumference of the contact unit 410. Hereinafter, a configuration and a combination of the contact unit 410 and the sensing unit according to one or more embodiments will be further described with reference to FIG. 9 and FIG. 10.

Figure 9:
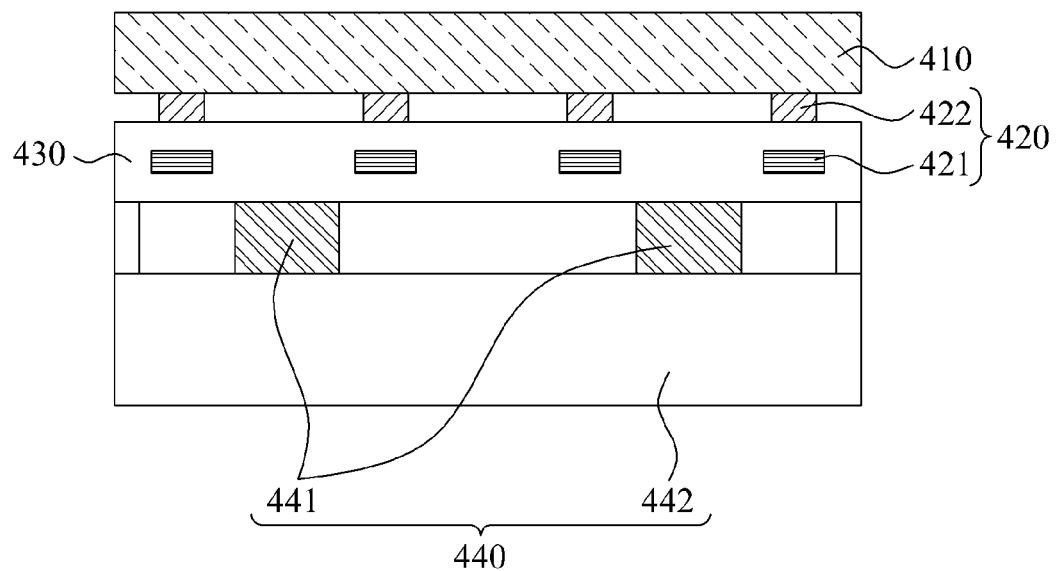
FIG. 9 and FIG. 10 illustrate side-cross sectional views of an interface controlling apparatus based on a combination of a contact unit and a sensing unit, according to one or more embodiments.
Figure 10:
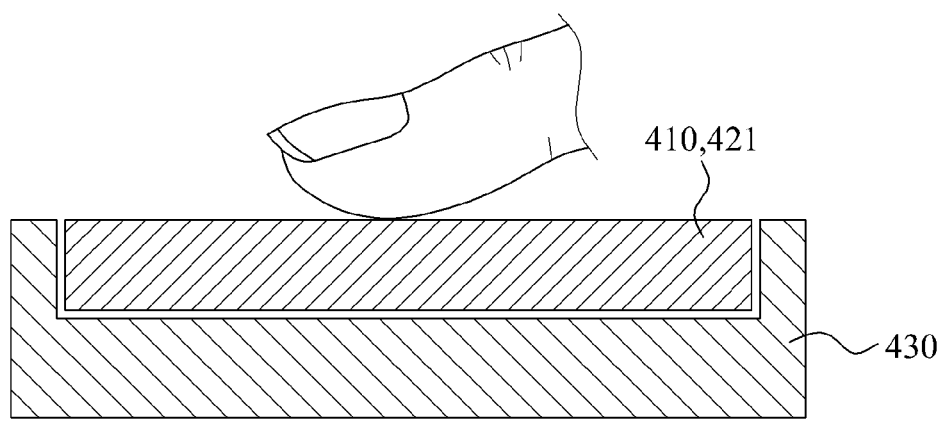
Figure 11:
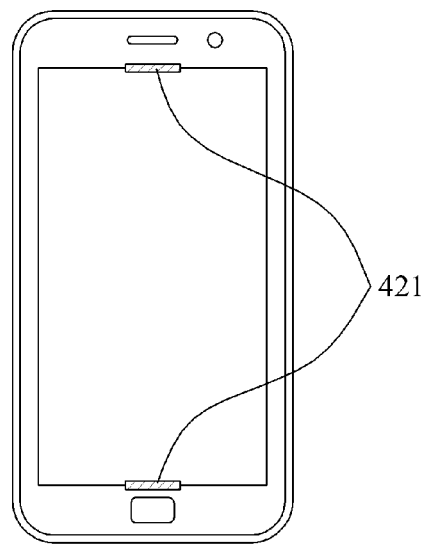
FIG. 11 through FIG. 15 illustrate an arrangement pattern of at least one force sensor of an interface controlling apparatus, according to one or more embodiments.
Figure 12:
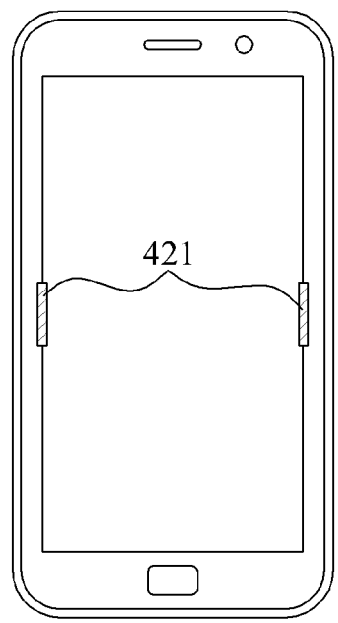
Figure 13:
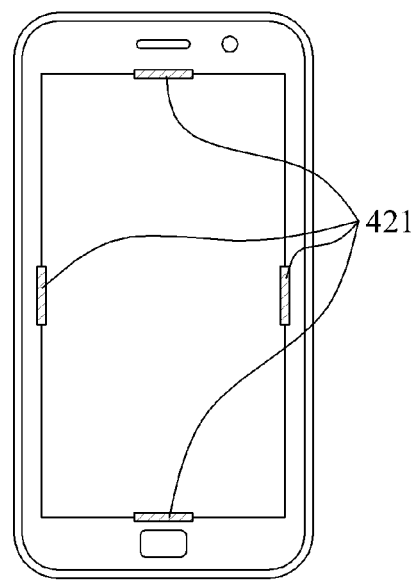
Figure 14:
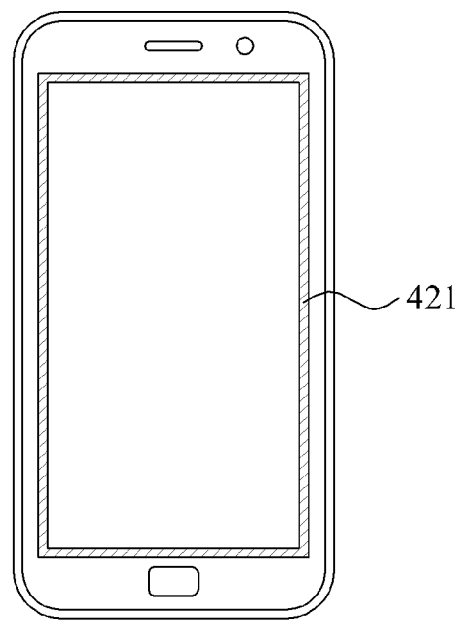
Figure 15:
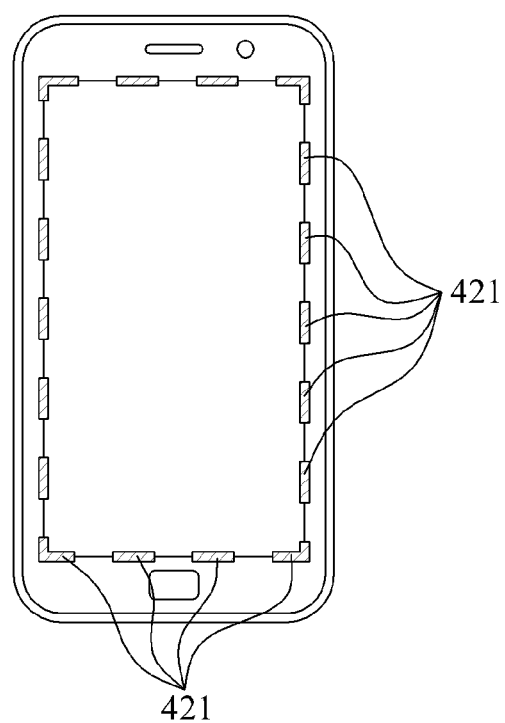
Figure 16:
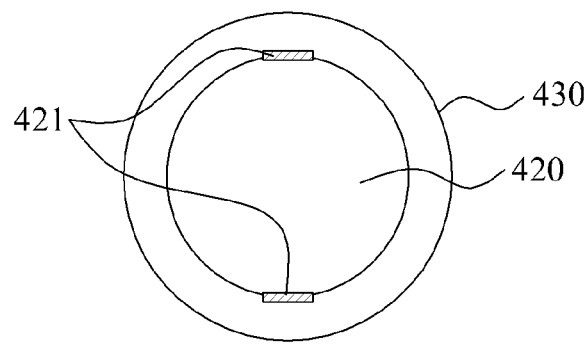
FIG. 16 through FIG. 26 illustrate a shape of each of a base and a contact unit of an interface controlling apparatus, according to one or more embodiments.
Figure 17:
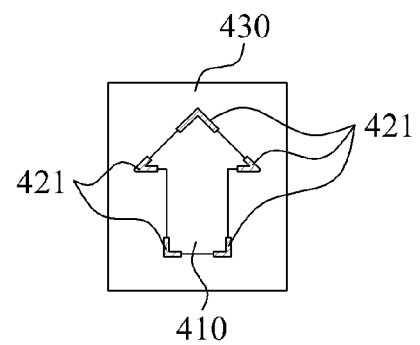
Figure 18:
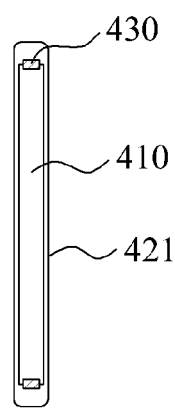
Figure 19:
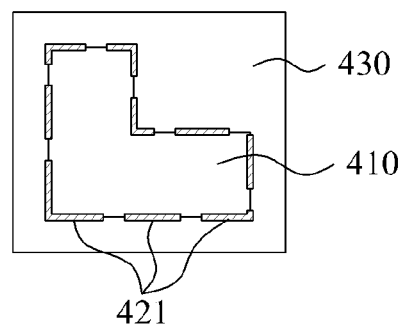
Figure 20:
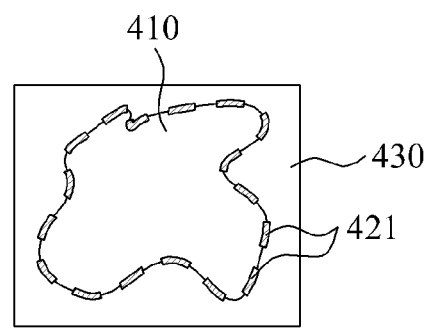
Figure 21:
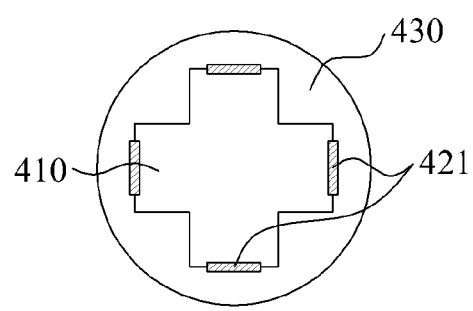
Figure 22:
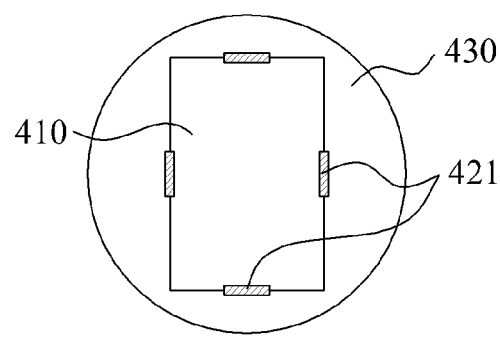
Figure 23:
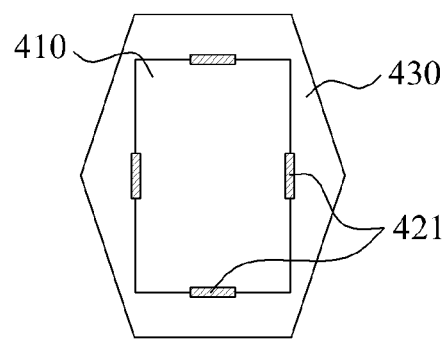
Figure 24:
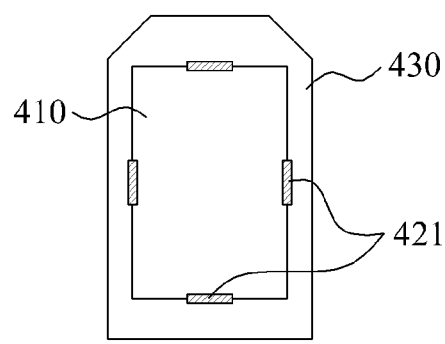
Figure 25:
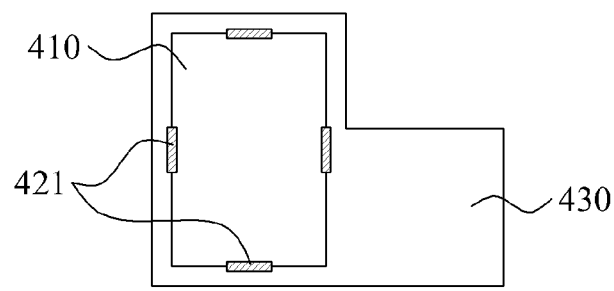
Figure 26:
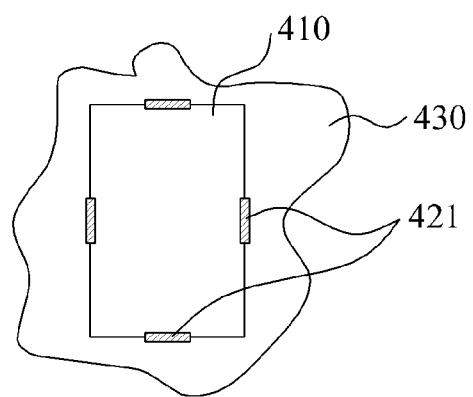

FIG. 9 and FIG. 10 illustrate side-cross sectional views of an interface controlling apparatus based on a combination of the contact unit 410 and a sensing unit, according to one or more embodiments.

Referring to FIG. 9, the interface controlling apparatus may include the contact unit 410 having flexibility to receive force input information, the sensing unit disposed on one surface of the contact unit 410, and provided with at least one force sensor 421 on the base 430 to measure the force input information received from the contact unit 410, and a content controller to generate content control information by analyzing the measured force input information, and to control content based on the content control information.

The contact unit 410 may be a member configured to receive, from a pointing object, force input information corresponding to a position of content or a control command with respect to the content, and may be a material that is restorable to an original shape, e.g., so as to receive further force input information of a user.

The sensing unit may include at least one force sensor 421 formed on one surface of the contact unit 410 to measure force input information received from the contact unit 410, and the base 430 formed with the at least one force sensor 421 on one surface of the base 430. Depending on embodiments, that the at least one force sensor 421 is formed on the base 430 may indicate that the at least one force sensor 421 is disposed on one surface of an upper plate or a lower plate of the base 430, and may also indicate that the at least one force sensor 421 is formed within the base 430, such as illustrated in FIG. 9.

Referring to FIG. 9, the base 430 may operate as a protective layer to protect the force sensor 421 from force input information or an external pressure or force. The force sensor 421 may be disposed between the base 430 and the contact unit 410 and may be formed on one surface of the contact unit 410 to receive force input information from the contact unit 410.

According to one or more embodiments, the interface control apparatus may further include the buffering unit 422 disposed on one surface of the contact unit 410 to transfer, to the force sensor 421, the force input information received from the contact unit 410, and a feedback provider 441 disposed on one surface of the sensing unit to generate a feedback in the case of a content control of the content controller.

Even though the feedback provider 441 is disposed below the force sensor 421 in FIG. 9, depending on embodiments, the feedback provider 441 may be disposed in the same layer as a layer in which the force sensor 421 is disposed, and may also be configured as a separate independent structure.

Depending on embodiments, the buffering unit 422 and the force sensor 421 may be disposed at facing positions to further efficiently transfer force input information. The feedback provider 441 may provide, to the user, a modality such as visual sense, auditory sense, or haptic sense, as only examples.

As illustrated in FIG. 9, the interface controlling apparatus may form a feedback providing layer 440 by providing a support layer 442 for supporting the feedback provider 441.

FIG. 10 illustrates a side-cross sectional view of an interface controlling apparatus including a mixed layer in which the contact unit 410 and the force sensor 421 are combined into an integrated type, according to one or more embodiments. The mixed layer may be formed by sequentially disposing the force sensor 421 and the contact unit 410 on an uneven portion that is formed on the base 430, and may also be formed by disposing, on the uneven portion, a material constituting the contact unit 410 and a material constituting the force sensor 421.

In this example, the mixed layer may be a configuration capable of sensing force of at least one axis, for example, three axes, and may be inserted into a lower portion of a display unit of a touch screen or a touch pad, may be inserted into a lower portion of a home button of a mobile device, or may be inserted into a lower portion of an integrated or divided Qwerty keyboard, as only examples.

Depending on embodiments, the mixed layer may be used together with a physical module configured to perform a predetermined operation, such as a physical module for transferring force input information, an LCD, an OLED, electronic paper, or a display device including a flexible display, as only examples. Also, the mixed layer may be used together with an independent device such as a physical module configured to sense input information associated with a temperature, pressure, or magnetic field, for example, excluding a force, or a mobile telephone, as only examples.

Hereinafter, an interface controlling apparatus based on a combination of an arrangement pattern of the force sensor 421 and the base 430 and an arrangement pattern of the contact unit 410, according to one or more embodiments, will be further described with reference to FIG. 11 through FIG. 26.

FIG. 11 through FIG. 15 illustrate an arrangement pattern of at least one force sensor 421, according to one or more embodiments.

In one or more embodiments, at least one force sensor 421 may be disposed in at least one opening that is formed between the base 430 and the contact unit 410, and may be formed along the circumference of the contact unit 410.

The contact unit 410 or the base 430 may include one of an oval shape, an elliptical shape, and a polygonal shape, and the at least one force sensor 421 may be arranged along the circumference of the contact unit 410, as only examples. In such an example, the at least one force sensor 421 may be physically arranged based on one arrangement pattern of a continuous pattern and a discontinuous pattern.

As illustrated in FIG. 11 through FIG. 15, the at least one force sensor 421 may include a variety of arrangement patterns based on the shape of the contact unit 410 or the base 430, and may include the continuous pattern or the discontinuous pattern based on the variety of arrangement patterns. For example, the at least one force sensor 421 may include an arrangement pattern in which the at least one force sensor 421 faces upper sides and/or lower sides of the contact unit 410, or may include an arrangement pattern in which the at least one force sensor 421 is continuously arranged along the circumference of the contact unit 410.

Alternative shapes, materials, and/or sizes, for example, of the contact unit 410 and the base 430 are equally available.

FIG. 16 through FIG. 26 illustrate a shape of each of the base 430 and the contact unit 410 of an interface controlling apparatus, according to one or more embodiments.

Referring to FIG. 16 through FIG. 26, depending on embodiments, the contact unit 410 may be provided in one of a circular shape, an oval shape, and a polygonal shape, and the at least one force sensor 421 may be arranged along the circumference of the contact unit 410. In an embodiment, the at least one force sensor 421 may be arranged by varying the number of and an arrangement pattern of force sensors 421 based on the shape of the contact unit 410.

Depending on embodiments, the base 430 may be provided in one of a circular shape, an oval shape, and a polygonal shape, for example, and the at least one force sensor 421 may be formed between the base 430 and the contact unit 410. The at least one force sensor 421 may be arranged by varying the number of and an arrangement pattern of force sensors 421 based on the shape of each of the base 430 and the contact unit 410. Hereinafter, an interface controlling method, e.g., where the base 430 and the contact unit 410 are provided in an example rectangular shape, according to one or more embodiments will be further described with reference to FIG. 27 through FIG. 56. Throughout the disclosure herein one or more method embodiments may be described with regard to an interface controlling apparatus, e.g., with one or more operations being performed by an interface controlling apparatus. However, such method embodiments are not limited to only such an interface controlling apparatus and force sensor, e.g., force sensor 421, and may be implemented by one or more different elements based on one or more differently sensed forces derived from one or more force sensors.

Figure 27:
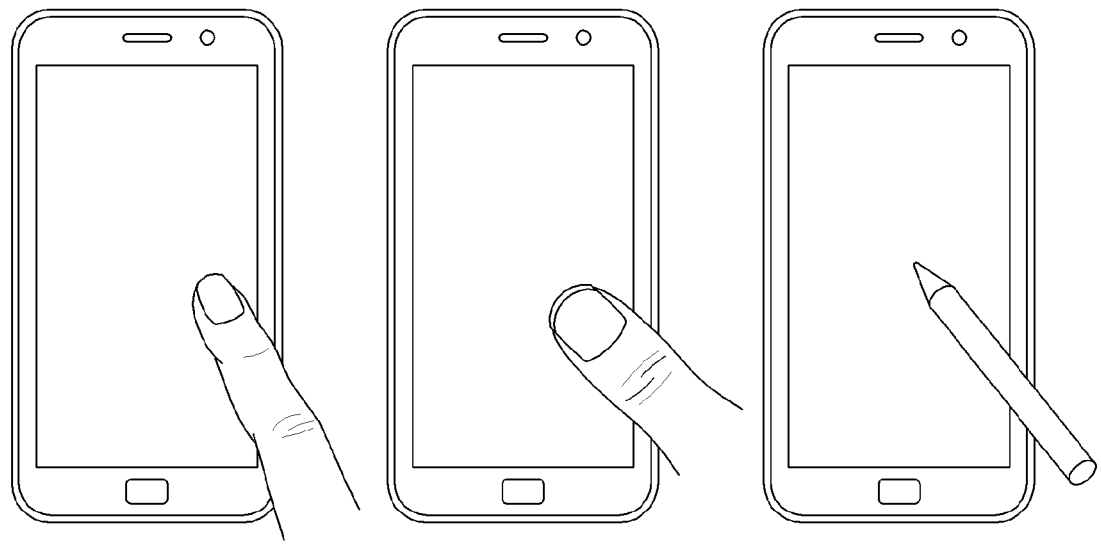
FIG. 27 illustrates an example of applying a physical interaction to an interface controlling apparatus, according to one or more embodiments.

FIG. 27 illustrates an example of applying a physical interaction to an interface controlling apparatus, according to one or more embodiments.

Referring to FIG. 27, to apply force input information to the interface controlling apparatus, a user may apply a force using a part of the human body such as a finger, for example, or may apply a force using an instrument such as a pen, or a button type input apparatus, for example, through a pointing object.

The interface controlling apparatus may generate content control information by computing information such as an action point of force, a direction of force, and a magnitude of force based on an appearance, the number of force sensors 421, an arrangement pattern of the force sensors 421, or a duration time of force, as only examples. Force input information may include the action point, the direction, the strength, or the duration time, for example, with respect to the force that is input to at least one force sensor 421.

FIG. 28 through FIG. 33 illustrate examples of measuring a force, according to one or more embodiments.

Figure 28:
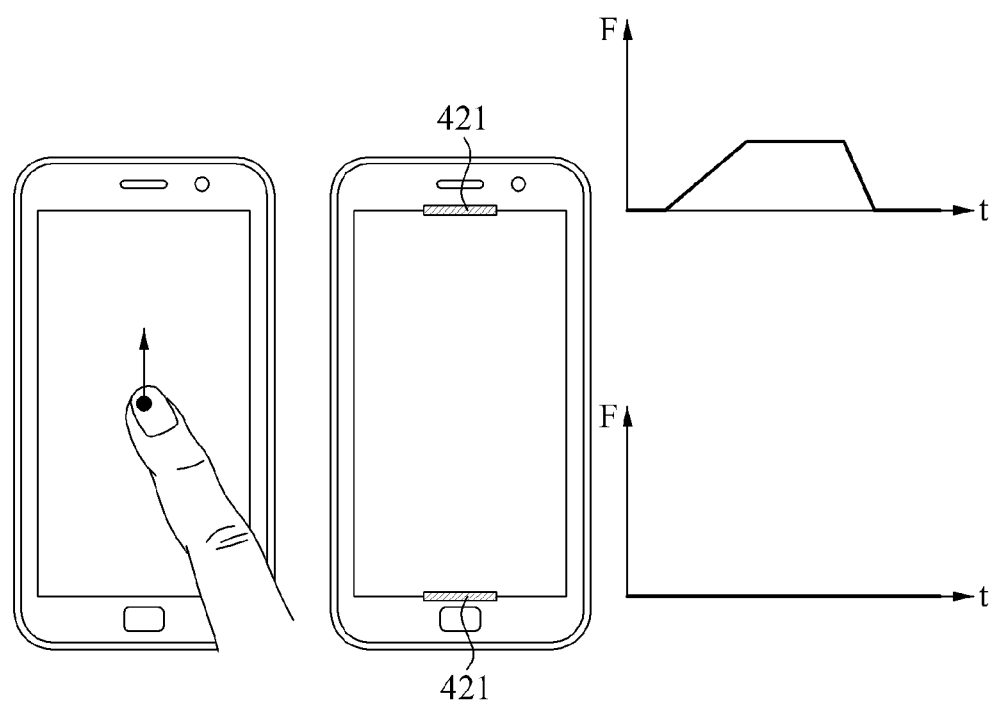
FIG. 28 through FIG. 33 illustrate examples of measuring a force, according to one or more embodiments.

Referring to FIG. 28, when a direction in which a force is being applied from a pointing object, for example, a finger, through the interface controlling apparatus is an upward direction, as indicated by an indicator in FIG. 28, a signal of the force sensor 421 being compressed by the applied force may be output as illustrated in the graph on the right side.

Figure 29:
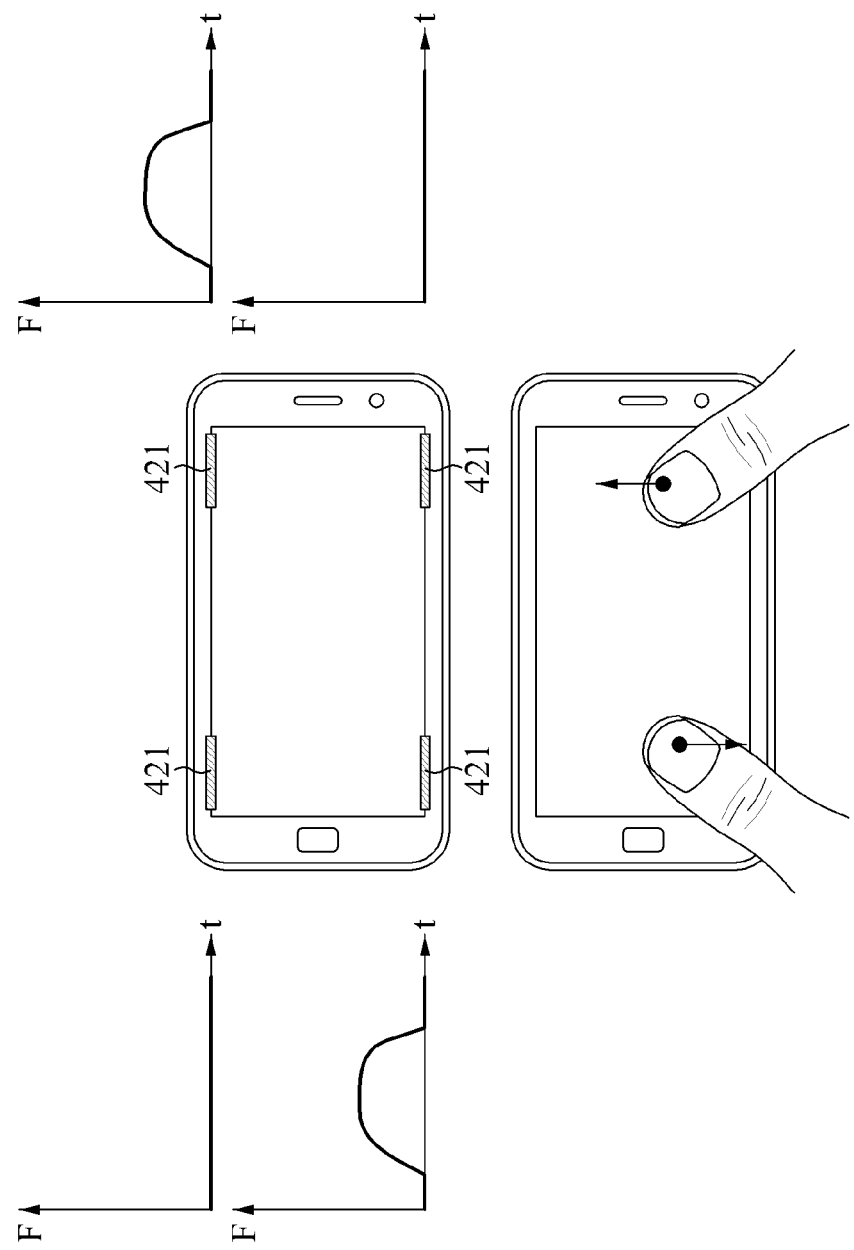

Referring to FIG. 29, when a force for generating a moment is applied to at least two points on the contact unit 410 through the interface controlling apparatus, a signal of the force sensor 421 for the force applied along the direction of the moment may be output as illustrated in the graphs on the left side and the right side.

Figure 30:
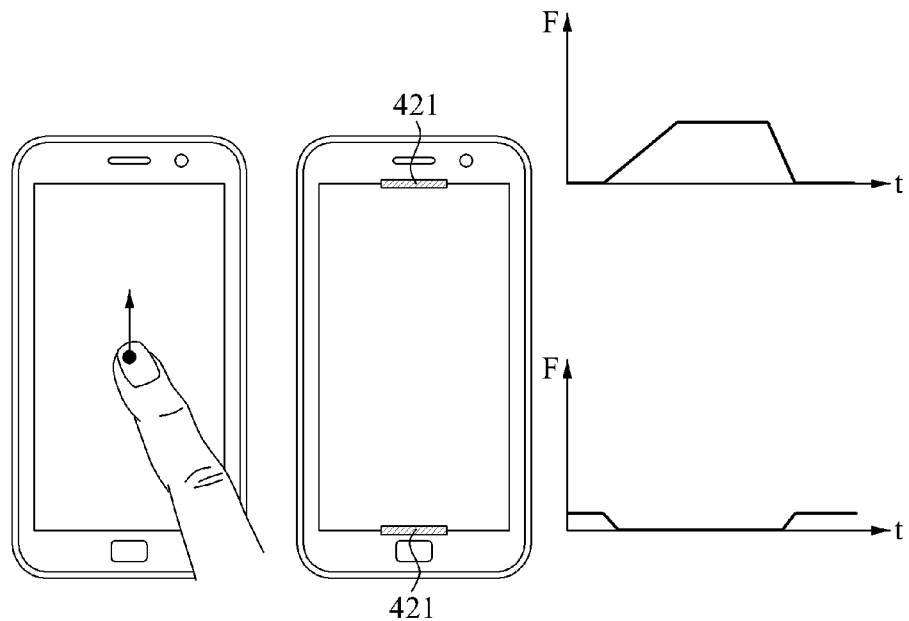

Referring to FIG. 30, the interface controlling apparatus may generate a force signal based on an direction, e.g., an upward direction, of the applied force and the corresponding applied pressure so that a predetermined offset may occur.

Figure 31:
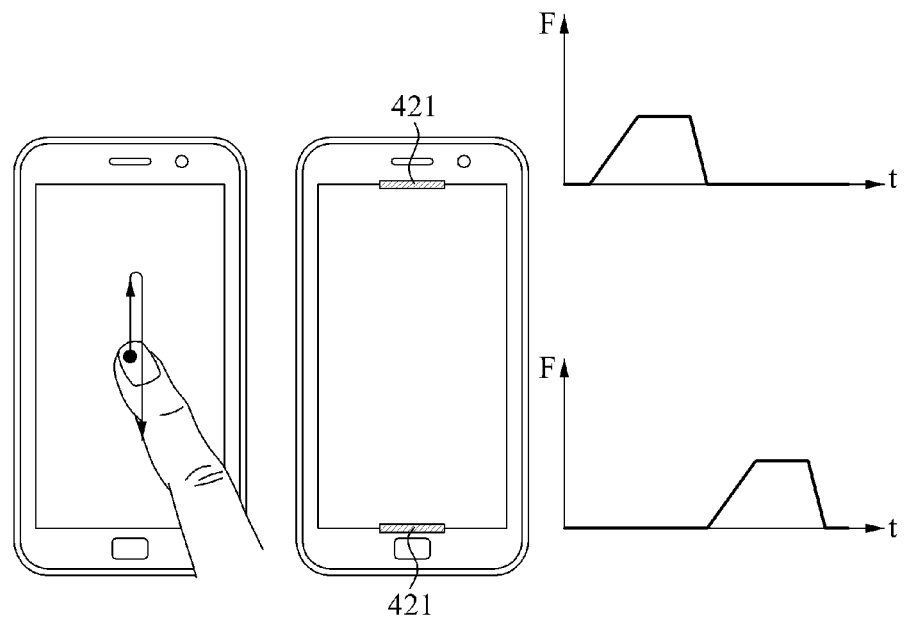

Referring to FIG. 31, when a direction of force applied from the pointing object, for example, a finger, through the interface controlling apparatus is an upward direction and the direction of the force then changes to be a downward direction, such resulting upward and downward signals of the force sensors 421, being compressed by the applied force, may be output as illustrated in the graphs on the right side, respectively.

Figure 32:
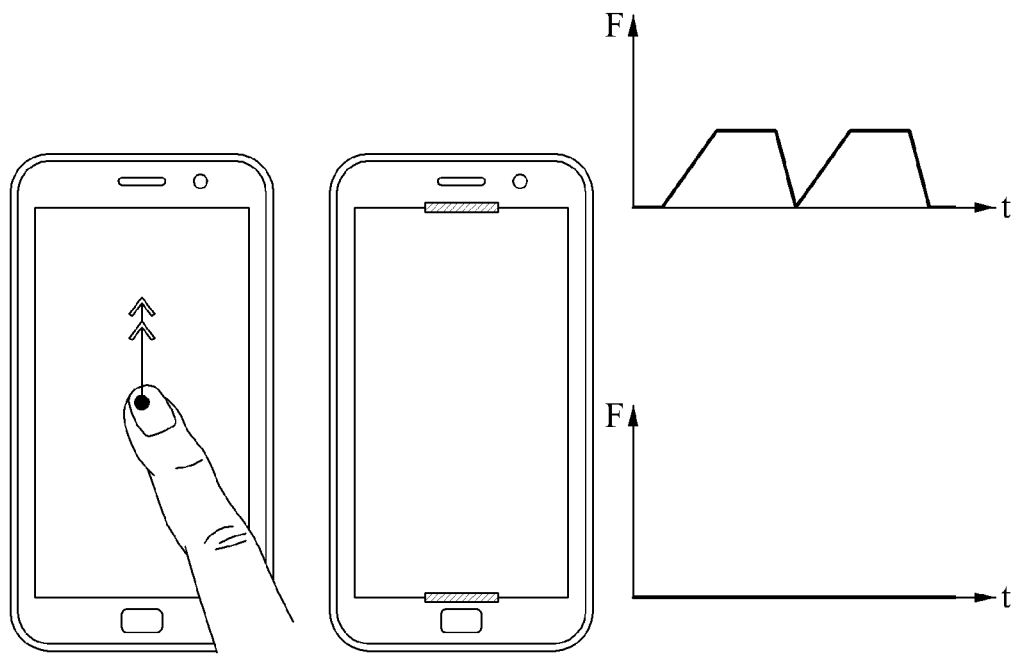

Referring to FIG. 32, when a direction of force applied from the pointing object, for example, a finger, through the interface controlling apparatus is an upward direction and then a speed or a magnitude of the force is changed in the upward direction again, a signal of the force sensor 421, being compressed by the applied force, may be output as illustrated in the graph on the right side.

Figure 33:
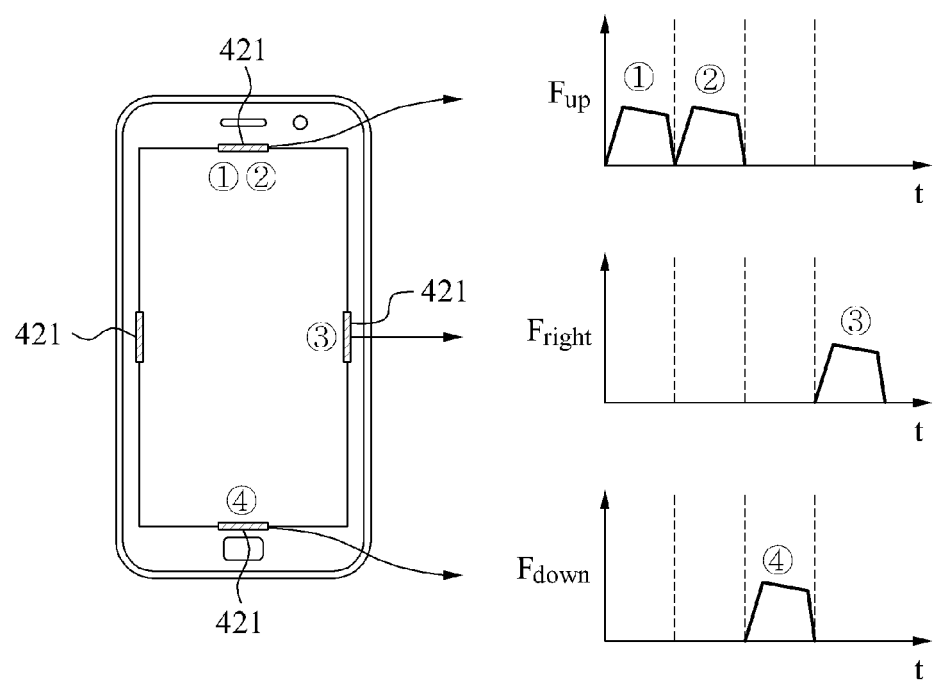

FIG. 33 illustrates an example of a releasing of a locking state, according to one or more embodiments. Referring to FIG. 33, the locking state may be released by performing an input during at least a predetermined period of time in at least one direction with respect to an arrangement pattern of the force sensors 421. As only an example, a force input code pattern indicating at least two inputs into the upward direction during a predetermined period of time, one input in the right direction, and one input in the downward direction may be used as a password for releasing the locking state.

Hereinafter, examples of an interface controlling method according to one or more embodiments will be further described with reference to FIG. 34 through FIG. 56.

The interface controlling apparatus may compute a direction of force or a direction of moment that has been applied based on an output of the force sensor 421, and may directly use a computed value or may further identify which of predetermined directions are represented by the direction of the force or direction of the moment based on the computed value.

The interface controlling apparatus may express the computed direction of force using units such as through degrees or rads, up/down/left/right, east/west/south/north, azimuth, or time, as only examples.

The interface controlling apparatus may compute a magnitude of the force applied via the force sensor 421, and may directly use a computed value or may express the computed magnitude as a one of plural predetermined strength levels based on the computed value.

The interface controlling apparatus may express the magnitude of force using physical units such as voltage, Newton (N), or psi, as only examples, or may express the magnitude of force as being one of high/low, one of strong/medium/weak, or one of predetermined levels 1 to 5, as only examples.

The interface controlling apparatus may compute a time duration that the force is applied, via the force sensor 421, and maintained, and may directly use the computed time duration value or may differently express the time duration based on the computed value.

The interface controlling apparatus may compute the time duration using a physical unit that indicates a unit of time such as a second, as only an example, or may express a time duration using one of short/long, or one of predetermined levels 1 to 3, as only examples.

In one or more embodiments, the interface controlling apparatus may compute the time duration in which the applied force is maintained, and may determine whether the input is of continuous sequential force.

The interface controlling apparatus may recognize a force that is continuously applied to different directions of FIG. 32 or the same direction of FIG. 33, and may differently control content based on the recognized continuously applied force.

Figure 34:
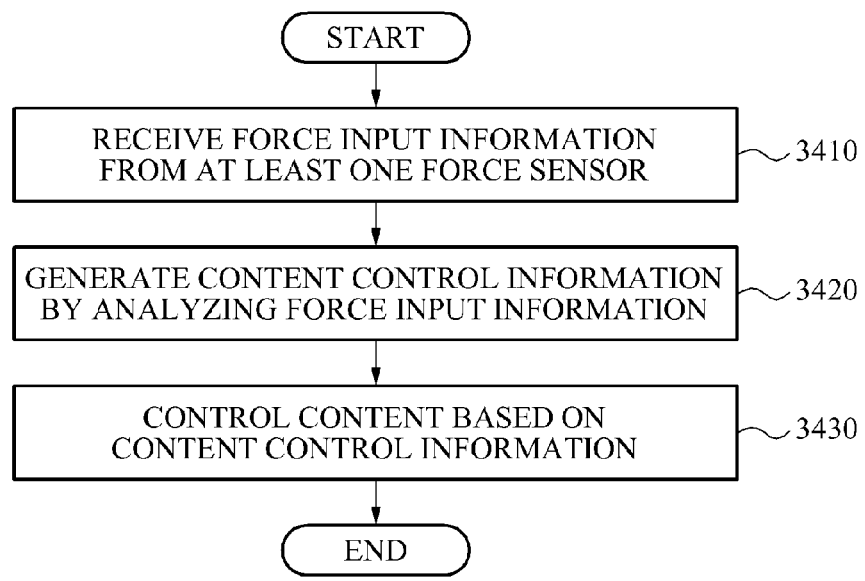
FIG. 34 illustrates an interface controlling method using a force, according to one or more embodiments.

FIG. 34 illustrates an interface controlling method, according to one or more embodiments.

Referring to FIG. 34, according to one or more embodiments, the interface controlling method using the force may be performed as described below. In operation 3410, the interface controlling apparatus may receive, from at least one force sensor, force input information associated with at least one input force.

In operation 3420, the interface controlling apparatus may generate content control information by analyzing the force input information. For example, the interface controlling apparatus may determine whether force input information satisfies a predetermined criterion, and may control an operation corresponding to the predetermined criterion to be executed when the force input information satisfies the predetermined criterion. Also, the interface controlling apparatus may determine whether the force input information is greater than a reference value set to control the content, and may generate the content control information when the force input information is greater than the reference value.

In operation 3430, the interface controlling apparatus may control the content based on the content control information.

Figure 35:
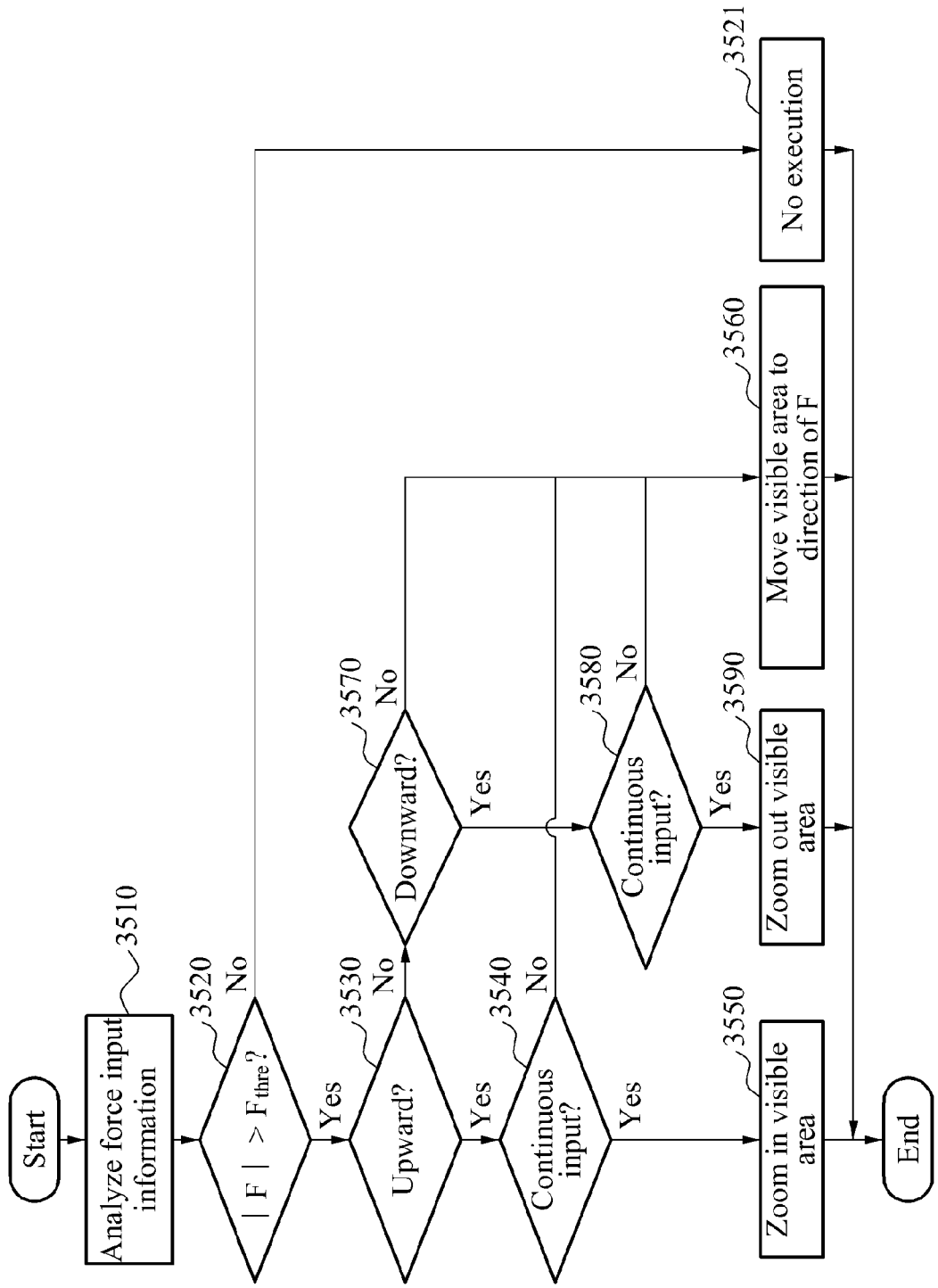
FIG. 35 through FIG. 37 illustrate examples of controlling a visible area of content, according to one or more embodiments.

FIG. 35 illustrates a method of controlling a visible area of content, according to one or more embodiments.

Referring to FIG. 35, the interface controlling apparatus may analyze force input information in operation 3510, and may determine whether an absolute force value |F| with respect the magnitude of force is greater than a predetermined force value $F_{thre}$ based on the analyzed force input information in operation 3520.

When the absolute force value |F| is less than $F_{thre}$, the interface controlling apparatus may determine that the input force was not an intended input, and thus, may not execute the content control in operation 3521.

On the contrary, when the absolute force value |F| is greater than $F_{thre}$, the interface controlling apparatus may determine a direction of the force and whether force is continuously input, and accordingly move or zoom in or zoom out the visible area of content, as only an example.

In an embodiment, the interface controlling apparatus may generate content control information used to determine a scroll direction of the visible area of content based on the force input information. For example, the interface controlling apparatus may scroll the visible area of content based on the content control information.

Referring again to FIG. 35, in an embodiment, the interface controlling apparatus may determine whether the direction of applied force is an upward direction, for example, and whether the force input information corresponds to a continuous application of force, in operations 3530 and 3540, and may control the display of a zoomed in corresponding visible area of content in operation 3550 when the direction of force is an upward direction and the force input information corresponds to the continuous input. In an embodiment, in operations 3570 and 3580, the interface controlling apparatus may determine whether the direction of applied force is a downward direction and whether force input information corresponds to a continuous input. When the direction of force is a downward direction and force input information represents a continuous input, the interface controlling apparatus may control the display of a zoomed out corresponding visible area of content in operation 3590.

On the contrary, when the force input information does not represent a continuous input, i.e., continuously applied force, the interface controlling apparatus may control a scrolling of information that can be displayed, e.g., for a particular document, sound, multimedia, or electronic book or periodical, as only examples, to move the visible area of content based on the direction of force in operation 3560.

Figure 36:
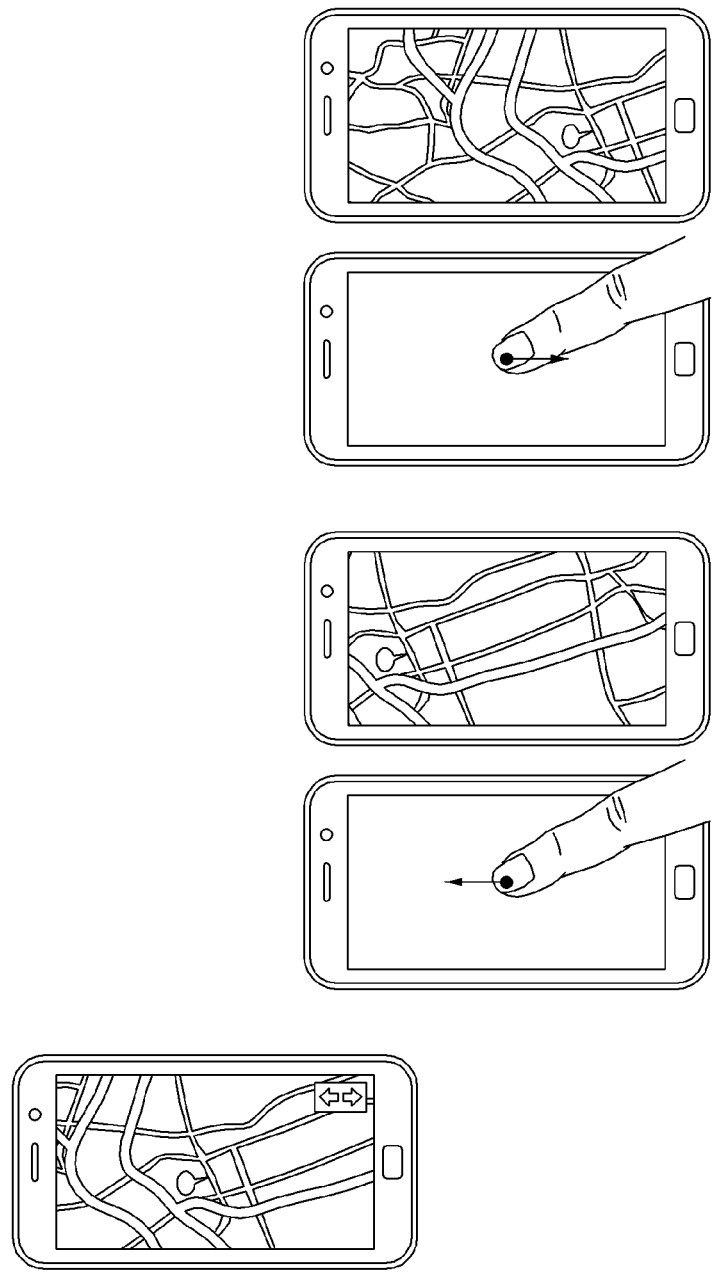
Figure 37:
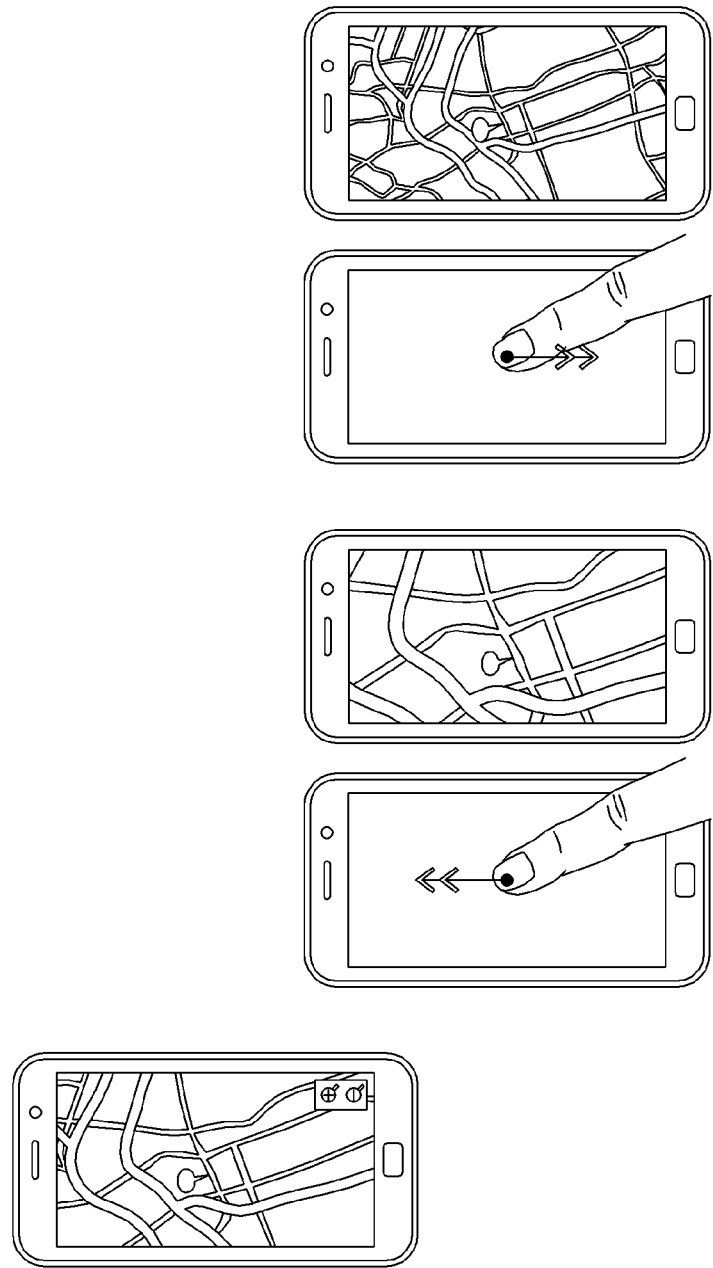

FIG. 36 and FIG. 37 illustrate examples of controlling a visible area of content, according to one or more embodiments.

The interface controlling apparatus may control such a display to continuously scroll visible areas of content by matching a direction of force applied by a user and a movement direction of content to be displayed.

Referring to FIG. 36, in an embodiment, as an analysis result of force input information, when the direction of force is an upward direction and when the force input information corresponds to a single input, the interface controlling apparatus may move the visible area of content upward, e.g., to visible portions of the content above a current visible area, i.e., corresponding to the determined upward direction of applied force. As an analysis result of force input information, when the direction of force is a downward direction and when the force input information corresponds to the single input, the interface controlling apparatus may move the visible area of content downward.

The available directions for applied force are not limited to just upward and downward directions, and thus, the interface controlling apparatus may move the visible area of content by recognizing all of two-dimensional (2D) or three-dimensional (3D) directions of force. The interface controlling apparatus may continuously drag the content by controlling the direction of force applied by the user and the movement direction of content to be displayed to be opposite to each other, as only an example.

The interface controlling apparatus may control a movement speed or a change speed of content by analyzing a magnitude of force, and may zoom in or zoom out the content along the direction of applied force.

In an embodiment, the interface controlling apparatus may generate content control information used to enlarge or reduce the visible area of content based on a combination of force input information, and may enlarge or reduce the visible area of content based on the content control information.

In an embodiment, the interface controlling apparatus may operate in a predetermined mode to enlarge or reduce the content, and may also enlarge or reduce the content based on a combination of predetermined sequential force input information, e.g., based on different force information that are sequentially detected.

Referring to FIG. 37, in one or more embodiments, as an analysis result of force input information, when the direction of force is determined to be an upward direction and when the force input information corresponds to the continuous input, the interface controlling apparatus may zoom in and display the visible area of content.

As an analysis result of force input information, when the direction of the force is determined to be a downward direction and when the force input information corresponds to the continuous input, the interface controlling apparatus may zoom out and display the visible area of content.

The interface controlling apparatus may determine whether the magnitude of applied force is within the range of a predetermined minimum force value or maximum force value. As only an example, unless the magnitude of force is out of the range, the interface controlling apparatus may control whether to change an enlargement speed or reduction speed based on a zoom rate corresponding to the magnitude of force.

Figure 38:
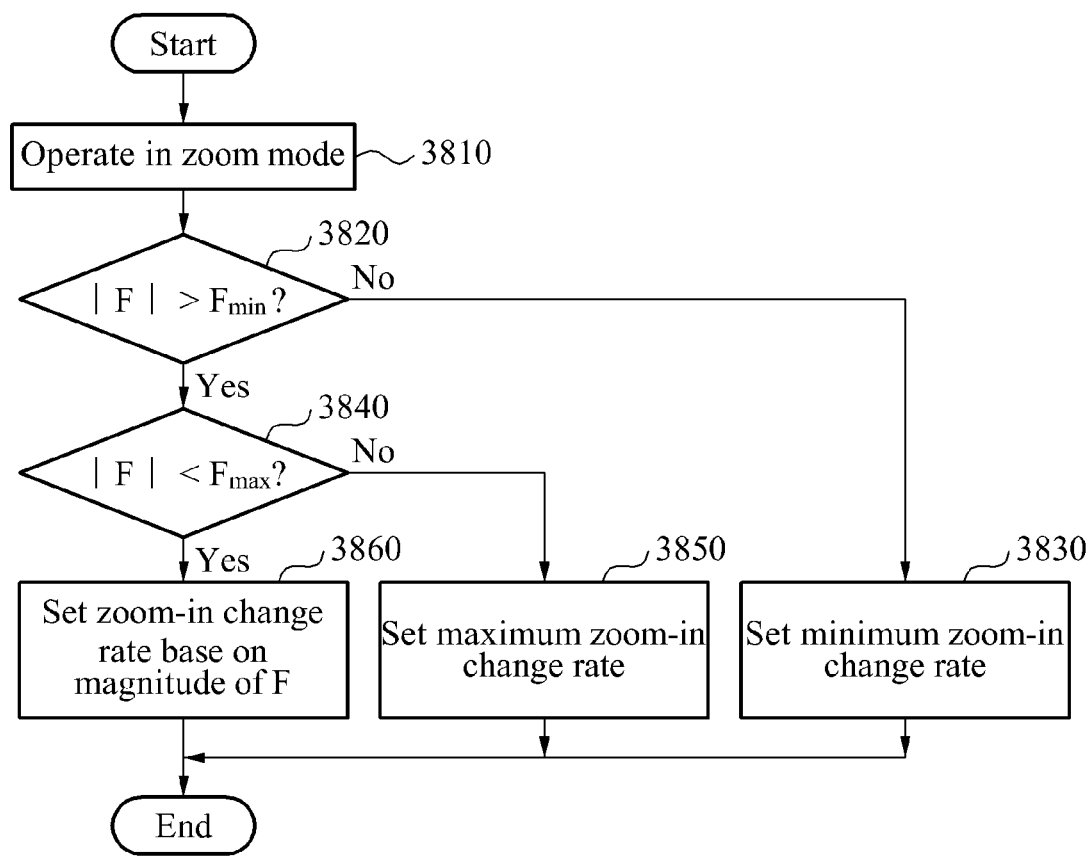
FIG. 38 illustrates a method of controlling an enlargement rate of a visible area of content, according to one or more embodiments.

FIG. 38 illustrates a method of controlling an enlargement rate of a visible area of content, according to one or more embodiments.

Referring to FIG. 38, as only an example, when the interface controlling apparatus operates in a zoom mode in operation 3810, the interface controlling apparatus may determine whether an absolute force value |F| with respect to a magnitude of force is within the range of a minimum force value $F_{min}$ or a maximum force value $F_{max}$, for example, whether the absolute force value |F| is greater than the minimum force value $F_{min}$ in operation 3820, and whether the absolute force value |F| is less than the maximum force value $F_{max}$ in operation 3840.

When the absolute force value |F| is less than the minimum force value $F_{min}$, the interface controlling apparatus may enlarge the visible area of content by setting a minimum zoom-in change rate in operation 3830.

When the absolute force value |F| is greater than the minimum force value $F_{min}$ and when the absolute force value |F| is greater than the maximum force value $F_{max}$, the interface controlling apparatus may enlarge the visible area of content by setting a maximum zoom-in change rate in operation 3850.

When the absolute force value |F| is greater than the minimum force value $F_{min}$ and when the absolute force value |F| is less than the maximum force value $F_{max}$, the interface controlling apparatus may enlarge the visible area of content by setting a zoom-in change rate based on the magnitude of force in operation 3860.

In one or more embodiments, the interface controlling apparatus may determine a selection item of content by analyzing force input information, and may generate content control information used to determine an upper area or a lower area with respect to a menu, a folder, or a file of content based on a combination of the force input information. For example, the interface controlling apparatus may determine the upper area or the lower area with respect to the menu, the folder, or the file of content based on the content control information.

Figure 39:
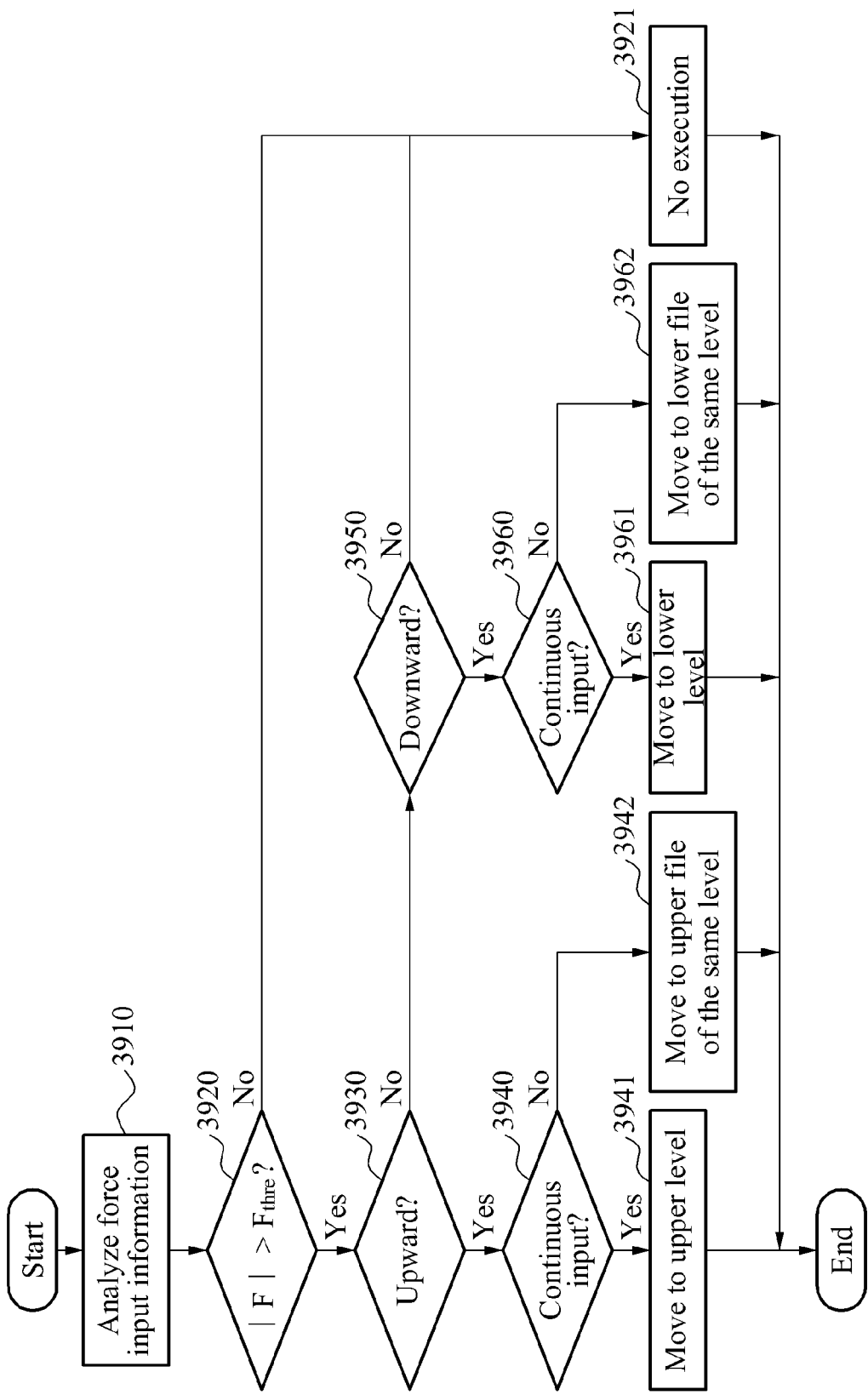
FIG. 39 illustrates a method of determining a selection item of content, according to one or more embodiments.

FIG. 39 illustrates a method of determining a selection item of content, according to one or more embodiments.

Referring to FIG. 39, the interface controlling apparatus may analyze force input information in operation 3910, and may determine whether an absolute force value |F| with respect to a magnitude of force is greater than a predetermined force value $F_{thre}$ in operation 3920. When the absolute force value |F| is less than $F_{thre}$, the interface controlling apparatus may determine that the input force is not an intended input, e.g., an inadvertent applied force, and thus, may not execute the content control in operation 3921.

On the contrary, when the absolute force value |F| is greater than $F_{thre}$, the interface controlling apparatus may determine a direction of force and whether the force is continuously input, and thereby determine a selection item of content, e.g., a displayed item that has been selected based upon the applied force. For example, the interface controlling apparatus may generate content control information used to determine a selection area with respect to a menu, a folder, or a file of content based on the force input information, and may determine the selection area with respect to the menu, the folder, or the file of content based on the content control information.

The interface controlling apparatus may determine whether the direction of applied force is an upward or downward direction in operations 3930 and 3950, and may determine whether the force input information corresponds to the continuous input in operations 3940 and 3960.

The method of FIG. 39, according to one or more embodiments, will be further described with reference to FIG. 40 through FIG. 42.

Figure 40:
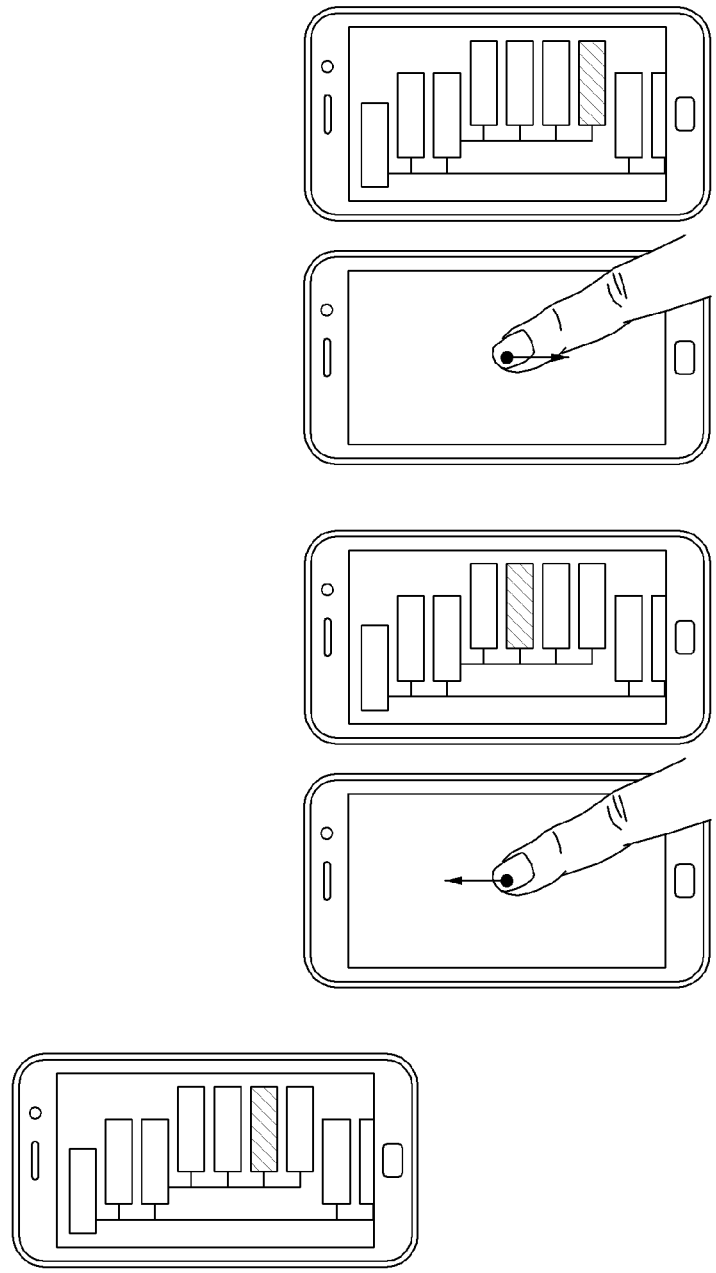
FIG. 40 through FIG. 42 illustrate examples of determining a selection item of content, according to one or more embodiments.
Figure 41:
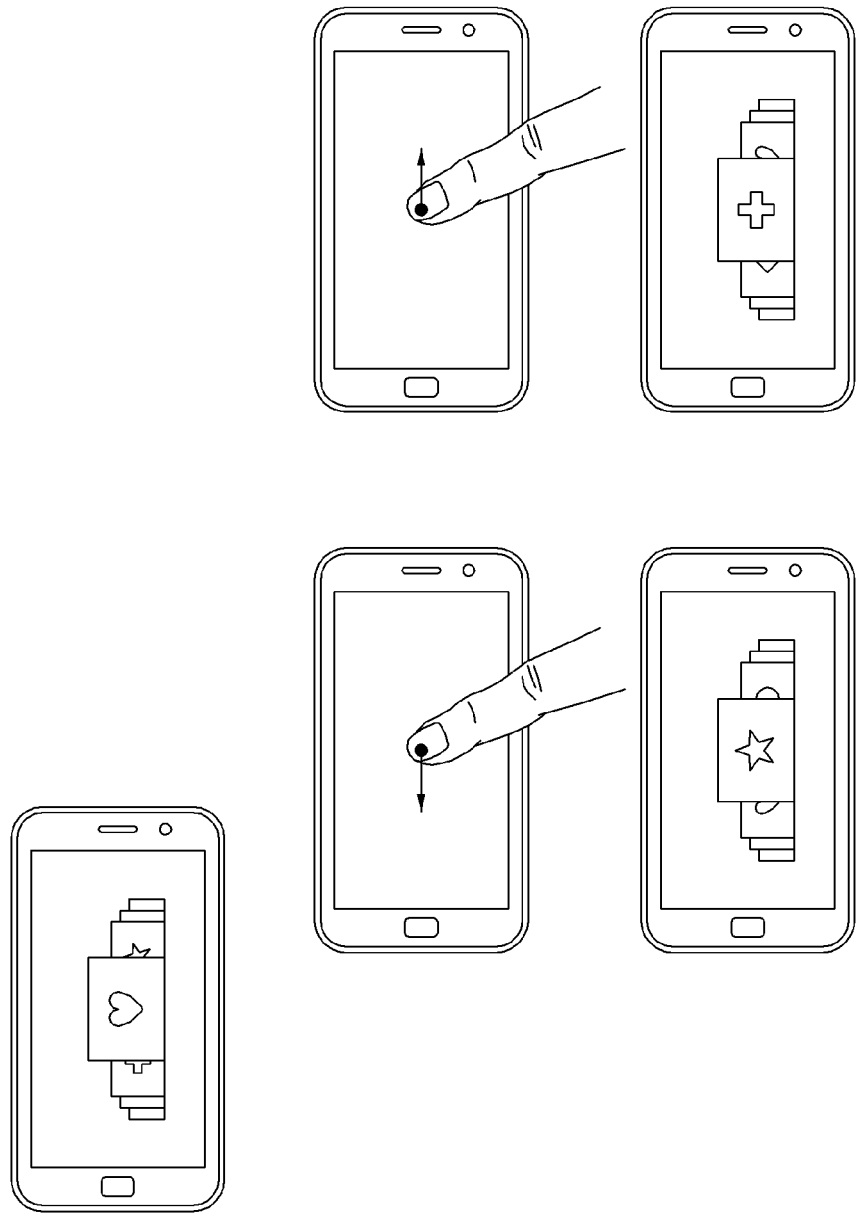
Figure 42:
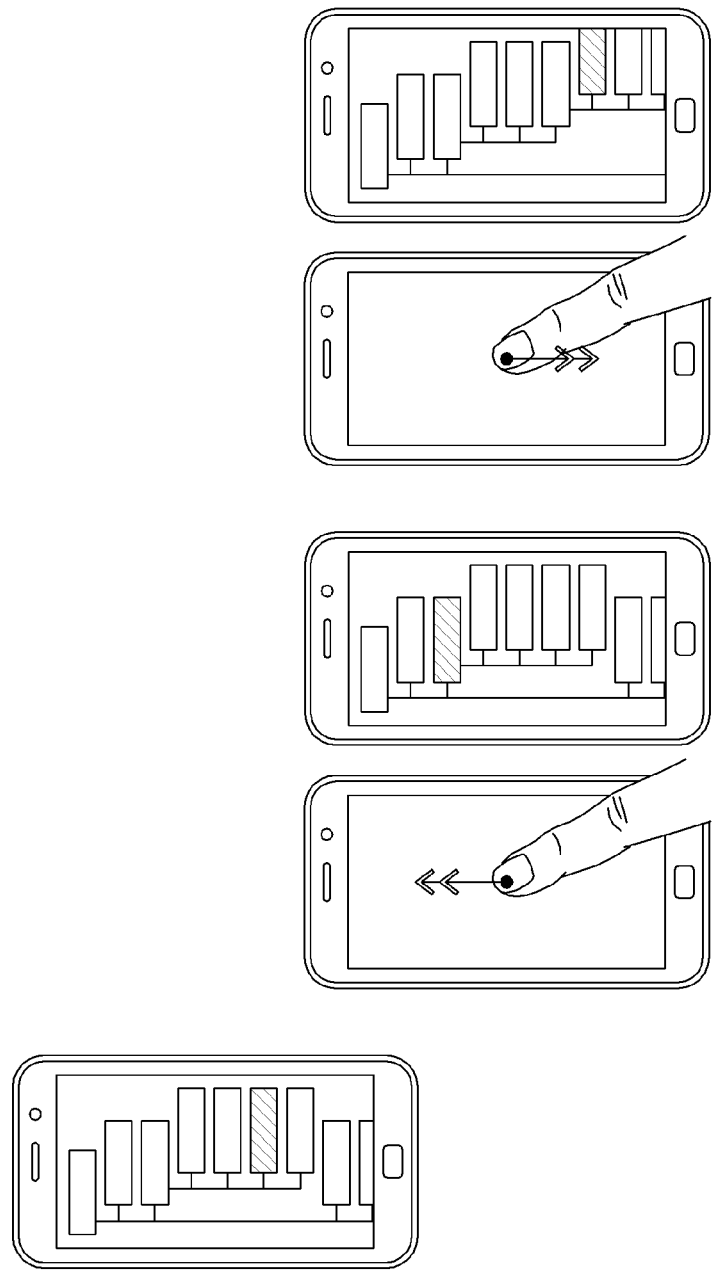

FIG. 40 through FIG. 42 illustrate examples of determining a selection item of content, according to one or more embodiments.

The interface controlling apparatus may determine the selection item of content by matching a direction of force applied by a user and a movement direction of content to be displayed.

As illustrated in FIG. 40, as an analysis result of force input information where items may be selected for movement to or between files, when the direction of force is an upward direction and when the force input information corresponds to a single input, the interface controlling apparatus may move the selection item to an upper file of the same level in operation 3942. As an analysis result of force input information, when the direction of force is a downward direction and when the force input information corresponds to the single input, the interface controlling apparatus may move the selection item of content to a lower file of the same level in operation 3962.

When the content is displayed in a horizontal direction as shown in FIG. 41, instead of being displayed in a vertical direction, the interface controlling apparatus may determine whether the direction of force is a left or right direction and thereby determine the selection item of content.

As illustrated in FIG. 42, as an analysis result of force input information, when the direction of force is an upward direction and when the force input information corresponds to the continuous input, the interface controlling apparatus may move the selection item of content to an upper level in operation 3941. As an analysis result of force input information, when the direction of force is a downward direction and when the force input information corresponds to the continuous input, the interface controlling apparatus may move the selection item of content to a lower level in operation 3961.

The direction of force is not limited to upward and downward directions and thus, the interface controlling apparatus may determine the selection item of content by recognizing all 2D or 3D directions of force, and may move a selection cursor with respect to a menu, a folder, or a file of the same level along a direction of force applied by the user. As only an example, a 3D direction of force may be represented by a 2D direction of force with a varied magnitude of applied force, e.g., with the magnitude of applied force controlling a depth, i.e., a third dimension, of the direction force.

In one or more embodiments, the interface controlling apparatus may continuously drag the content by controlling the direction of force applied by the user and the movement direction of content to be displayed to be opposite to each other.

In one or more embodiments, the interface controlling apparatus may control a movement speed or a change speed of content by analyzing the magnitude of the applied force, and may control a movement speed of the selection cursor with respect to a menu, folder, or file, for example, by analyzing the magnitude of force.

Figure 43:
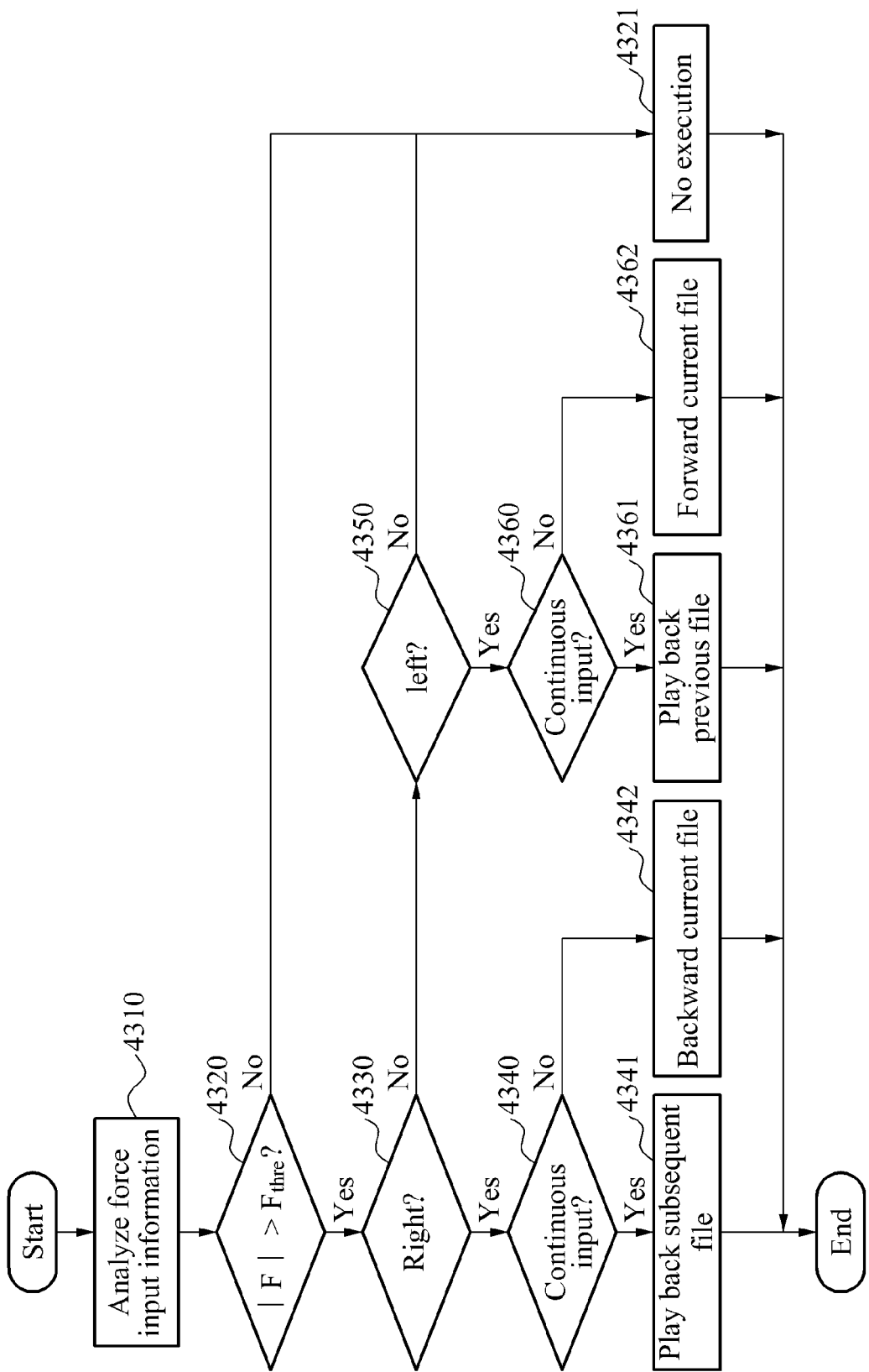
FIG. 43 illustrates a method of controlling multimedia content, for example, a sound source file, according to one or more embodiments.

FIG. 43 illustrates a method of controlling multimedia content, for example, a sound source file, according to one or more embodiments.

In one or more embodiments, the interface controlling apparatus may generate content control information used to determine a search direction or a search section with respect to multimedia of the content, e.g., displayed multimedia content, based on force input information associated with at least one force input, or may generate content control information used to determine a previous file or a subsequent file with respect to different multimedia files of the content based on a combination of the force input information. The interface controlling apparatus may determine the previous file or the subsequent file with respect to the multimedia of the content based on the content control information.

Referring to FIG. 43, the interface controlling apparatus may analyze force input information in operation 4310, and may determine whether an absolute force value |F| with respect to a magnitude of force is greater than a predetermined force value $F_{thre}$ in operation 4320.

When the absolute force value |F| is less than $F_{thre}$, the interface controlling apparatus may determine that the input force is not an intended input, and thus, may not execute the content control in operation 4321. On the contrary, when the absolute force value |F| is greater than $F_{thre}$, the interface controlling apparatus may determine a direction of force and whether the force is continuously input and thereby control multimedia content.

The interface controlling apparatus may determine whether the direction of applied force is a left or right direction, as only an example, in operations 4330 and 4350, and may determine whether the force input information corresponds to the continuous input in operations 4340 and 4360.

Hereinafter, a method of FIG. 43 will be further described with reference to FIG. 44 and FIG. 45, according to one or more embodiments.

Figure 44:
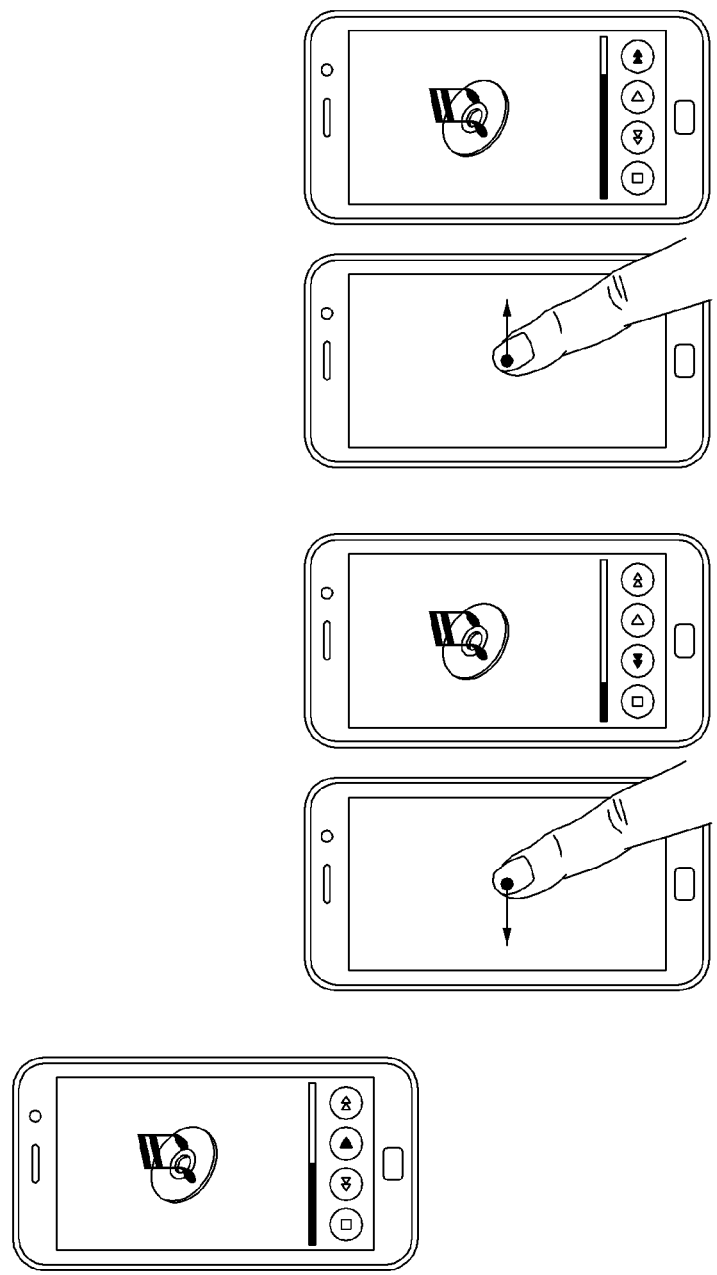
FIG. 44 and FIG. 45 illustrate examples of controlling multimedia content, for example, a sound source file, according to one or more embodiments.
Figure 45:
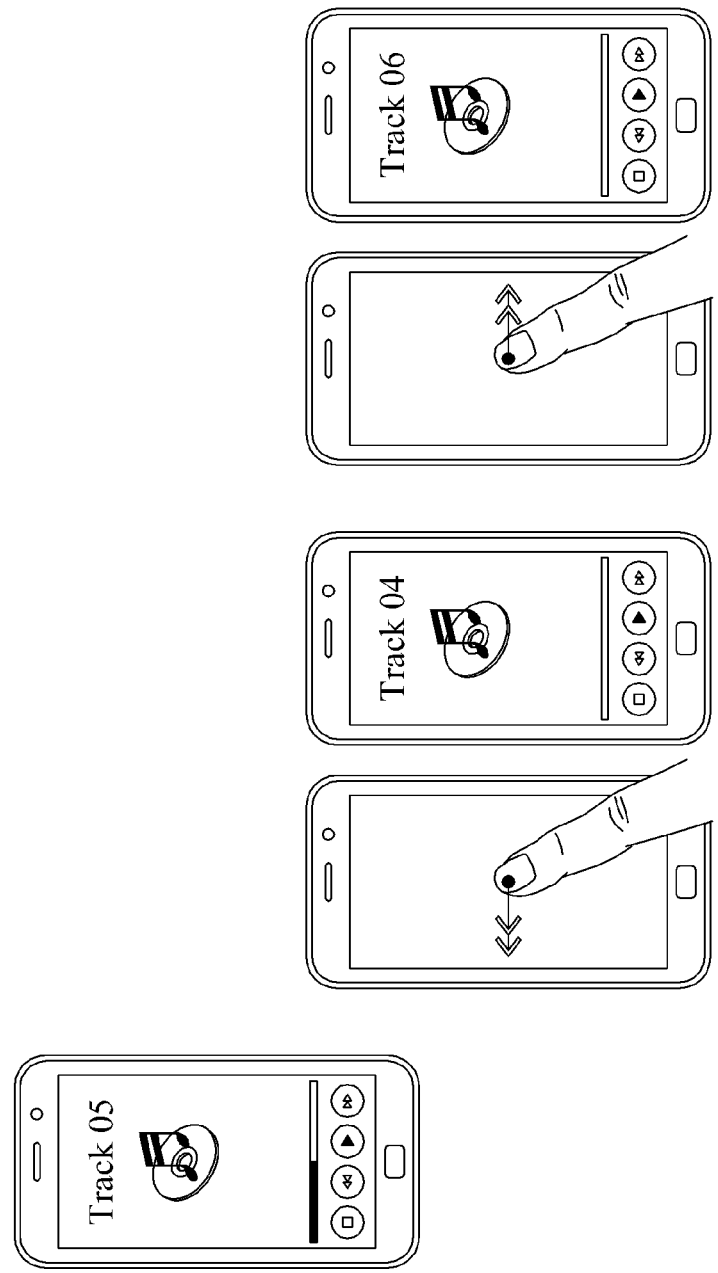

FIG. 44 and FIG. 45 illustrate examples of controlling multimedia content, for example, a sound source file, according to one or more embodiments.

The interface controlling apparatus may control multimedia content by matching a direction of force applied by a user and a movement direction of content to be displayed.

Referring to FIG. 44, as an analysis result of force input information, when the direction of force is a right direction and when the force input information corresponds to a single input, the interface controlling apparatus may control a current file to be changed, e.g., a previous sound file may be played back or selected for play back, in operation 4342. As an analysis result of force input information, when the direction of force is a left direction and when the force input information corresponds to the single input, the interface controlling apparatus may similarly control a current sound file to be changed to a subsequent sound file in operation 4362.

Referring to FIG. 45, as an analysis result of force input information, when the direction of force is a right direction and when the force input information corresponds to the continuous input, the interface controlling apparatus may control a subsequent sound file to be played back or selected for playback in operation 4341. As an analysis result of force input information, when the direction of force is a left direction and when the force input information corresponds to the continuous input, the interface controlling apparatus may control a previous file to be played back or selected for playback in operation 4361.

The direction of force is not limited to left and right directions and thus, the interface controlling apparatus may determine the selection item of content by recognizing all of the 2D or 3D directions of force.

In one or more embodiments, the interface controlling apparatus may control multimedia content by matching the direction of applied force and a search direction, or may adjust a search speed, playback speed rate, level of volume, or amount of brightness, as only examples, by analyzing the magnitude of force.

Figure 46:
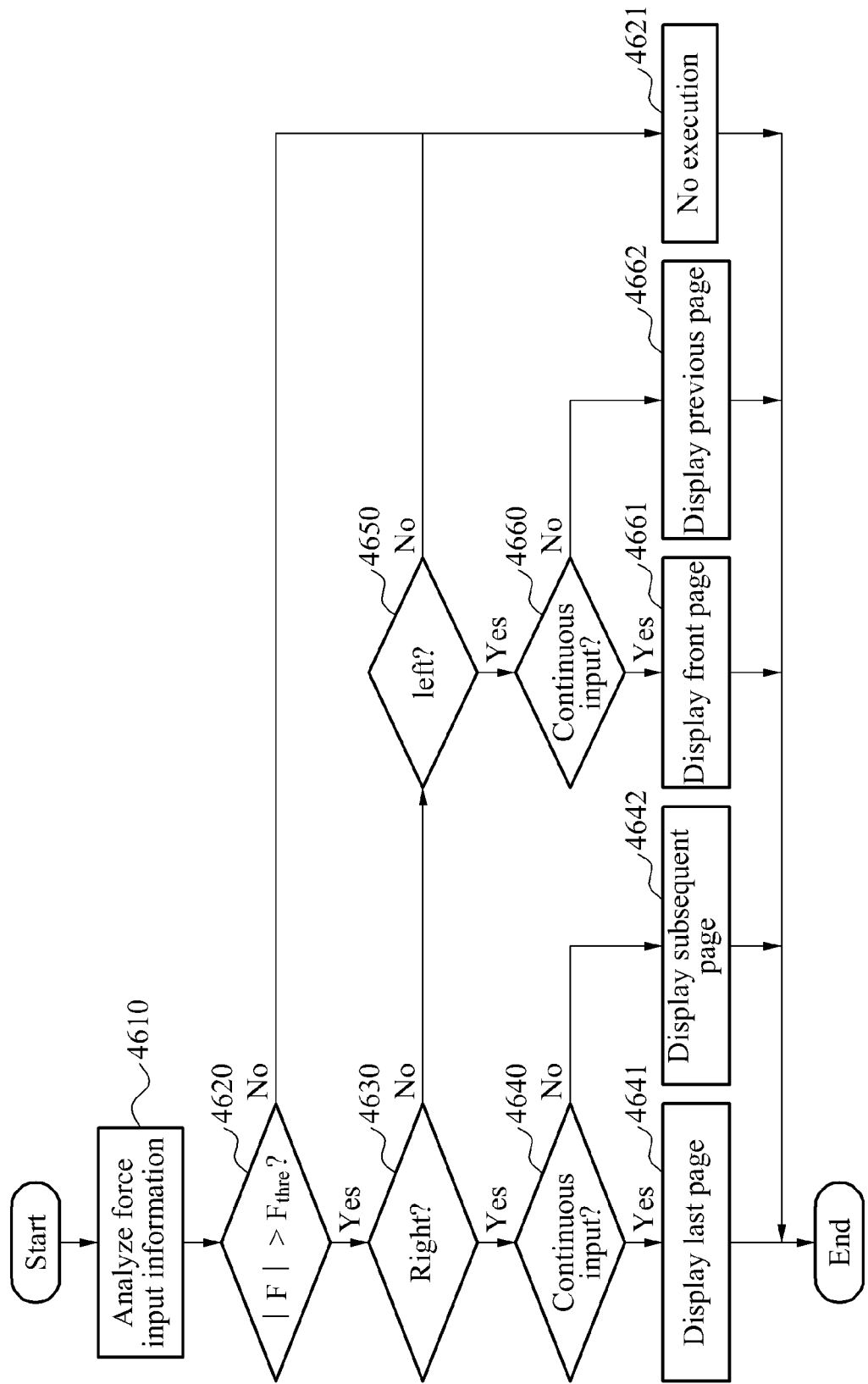
FIG. 46 illustrates a method of controlling multimedia content, for example, an e-book, according to one or more embodiments.

FIG. 46 illustrates a method of controlling multimedia content, for example, an e-book, according to one or more embodiments.

Depending on embodiments, when an absolute force value with respect to a magnitude of force is greater than a predetermined force value, the interface controlling apparatus may control multimedia content by determining a direction of force and whether force is continuously input. For example, the interface controlling apparatus may generate the content control information used to determine a page turning direction with respect to multimedia of the content based on the force input information, and may determine the page turning direction with respect to the multimedia of the content based on the content control information. The interface controlling apparatus may generate the content control information used to control a front page or a last page of the content to be displayed based on a combination of the force input information, and may control the front page or the last page of the content to be displayed based on the content control information.

Referring to FIG. 46, the interface controlling apparatus may analyze force input information in operation 4610, and may determine whether an absolute force value |F| with respect to a magnitude of force is greater than a predetermined force value $F_{thre}$ in operation 4620. When the absolute force value |F| is less than $F_{thre}$, the interface controlling apparatus may determine that the input force is not an intended input, and thus, may not execute the content control in operation 4621.

The interface controlling apparatus may determine whether the direction of applied force is a left or right direction in operations 4630 and 4650, and may determine whether the force input information corresponds to the continuous input in operations 4640 and 4660.

Hereinafter, a method of FIG. 46 will be further described with reference to FIG. 47 and FIG. 48, according to one or more embodiments.

Figure 47:
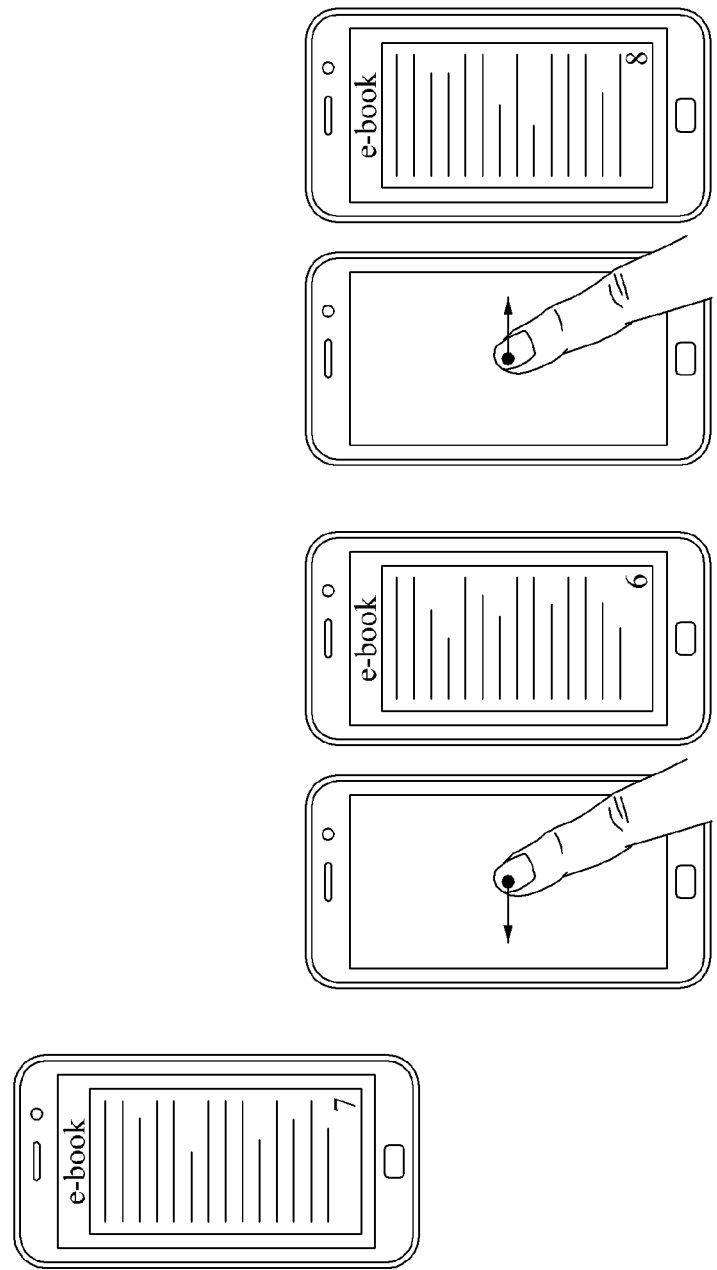
FIG. 47 and FIG. 48 illustrate examples of controlling multimedia content, for example, an e-book, according to one or more embodiments.
Figure 48:
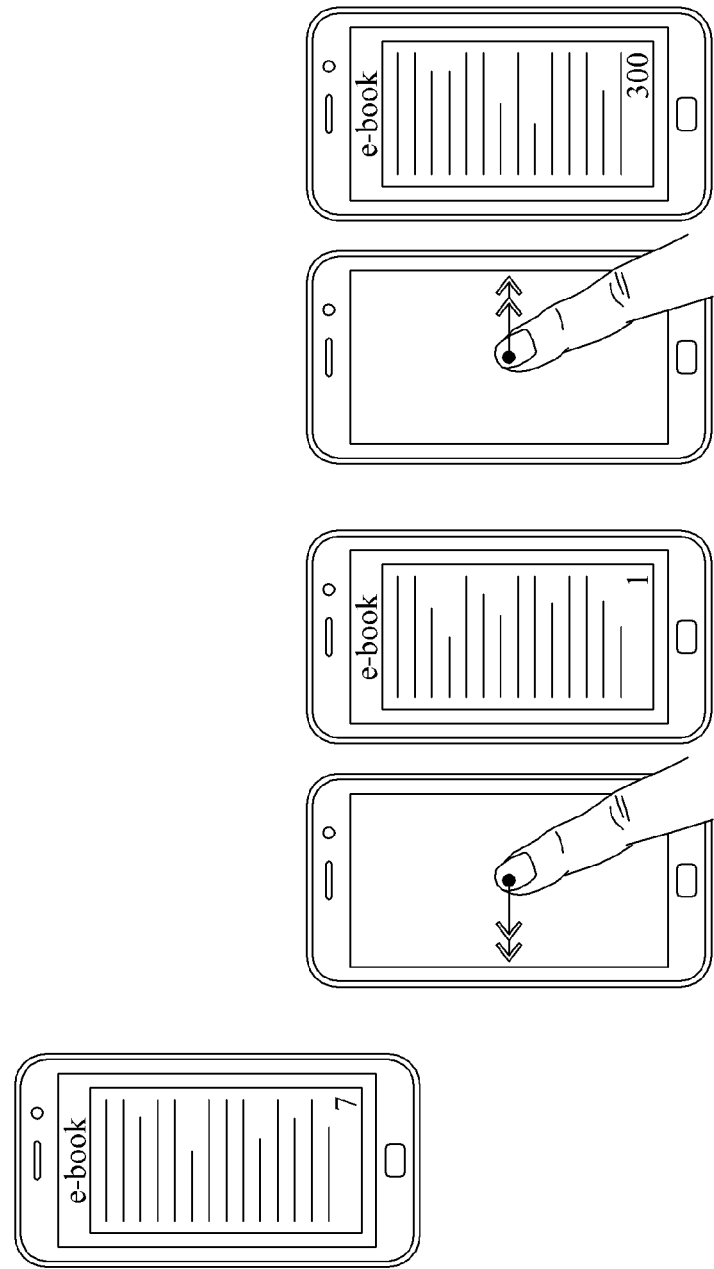

FIG. 47 and FIG. 48 illustrate examples of controlling multimedia content, for example, an e-book, according to one or more embodiments.

Referring to FIG. 47, as an analysis result of force input information, when the direction of force is a right direction and when the force input information corresponds to a single input, the interface controlling apparatus may control a subsequent page to be displayed instead of a current page in operation 4642. As an analysis result of force input information, when the direction of force is a left direction and when the force input information corresponds to a single input, the interface controlling apparatus may control a previous page to be displayed instead of a current page in operation 4662.

Referring to FIG. 48, as an analysis result of force input information, when the direction of force is a right direction and when the force input information corresponds to the continuous input, the interface controlling apparatus may control a last or back page to be displayed in operation 4641. As an analysis result of force input information, when the direction of force is a left direction and when the force input information corresponds to the continuous input, the interface controlling apparatus may control a first or front page to be displayed in operation 4661.

The interface controlling apparatus may receive at least one other item of input information, and may generate content control information based on the force input information and the at least one other item of input information.

The interface controlling apparatus may generate content control information based on the force input information and at least one other item of various input information such as contact input information or acceleration information, angular velocity information, or geomagnetic information, as only examples, e.g., that are input via other input sensors.

The interface controlling apparatus may select a target of content based on contact position information, and may control a value associated with a state of the target based on content control information that is generated by analyzing the force input information.

Figure 49:
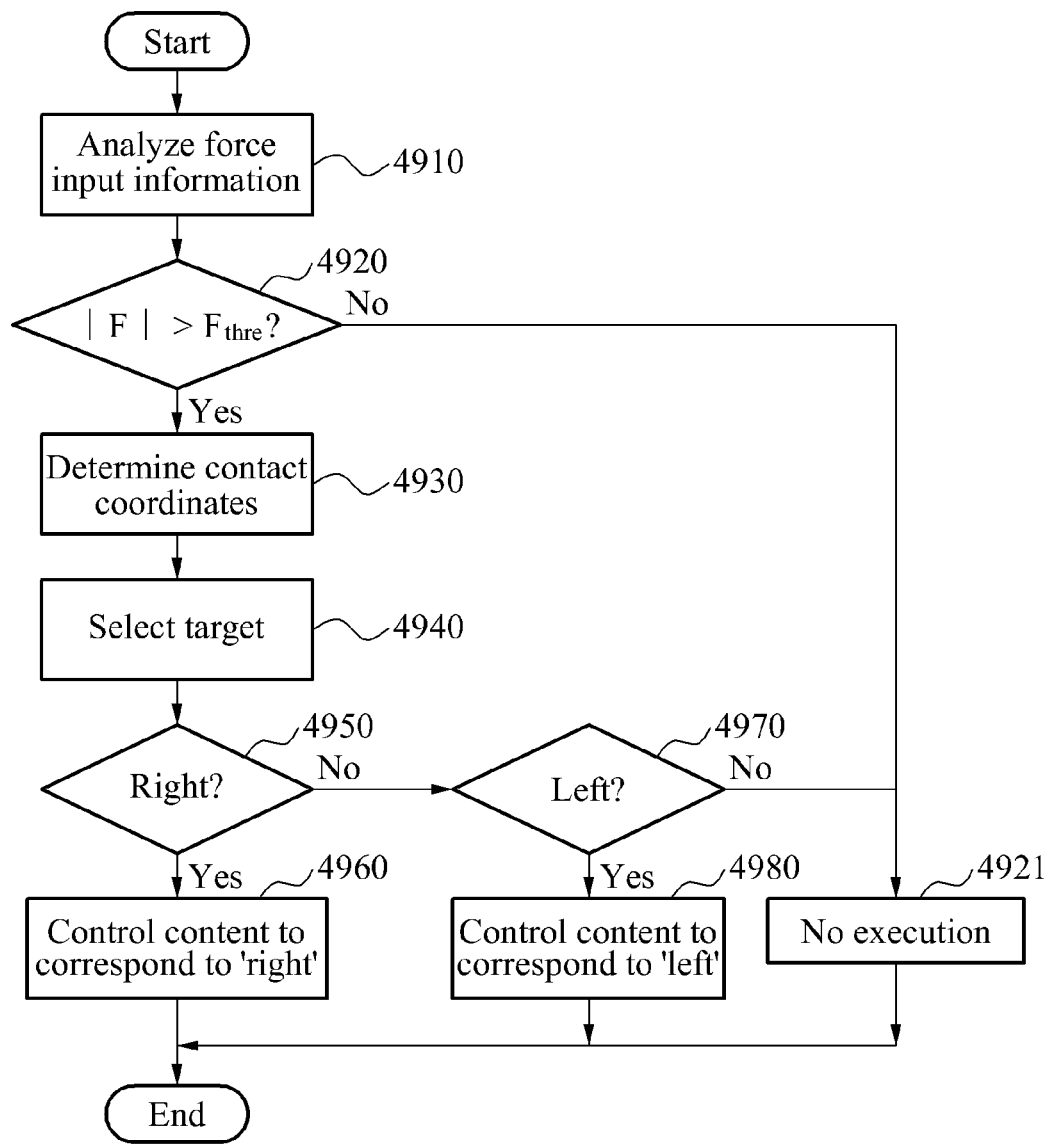
FIG. 49 illustrates a method of selecting and controlling a predetermined target, according to one or more embodiments.

FIG. 49 illustrates a method of selecting and controlling a predetermined target, according to one or more embodiments.

The interface controlling apparatus may generate content control information based on force input information and contact input information, may determine a target of content based on the contact input information, and may control the determined target based on the force input information.

Referring to FIG. 49, the interface controlling apparatus may analyze force input information in operation 4910, and may determine whether an absolute force value |F| with respect to a magnitude of force is greater than a predetermined force value $F_{thre}$ in operation 4920.

When the absolute force value |F| is less than $F_{thre}$, the interface controlling apparatus may determine that the input force is not an intended input, and thus, may not execute the content control in operation 4921.

The interface controlling apparatus may determine contact coordinates by analyzing the received contact input information in operation 4930, and may determine a target of content corresponding to the contact coordinates in operation 4940. In operations 4950 and 4970, the interface controlling apparatus may determine whether the direction of applied force is a right or left direction. In one or more embodiments, some coordinate information may be obtained based upon information from a touch pad or touch screen positioned relative to the contact surface of a contact unit.

Hereinafter, a method of FIG. 49 will be further described with reference to FIG. 50.

Figure 50:
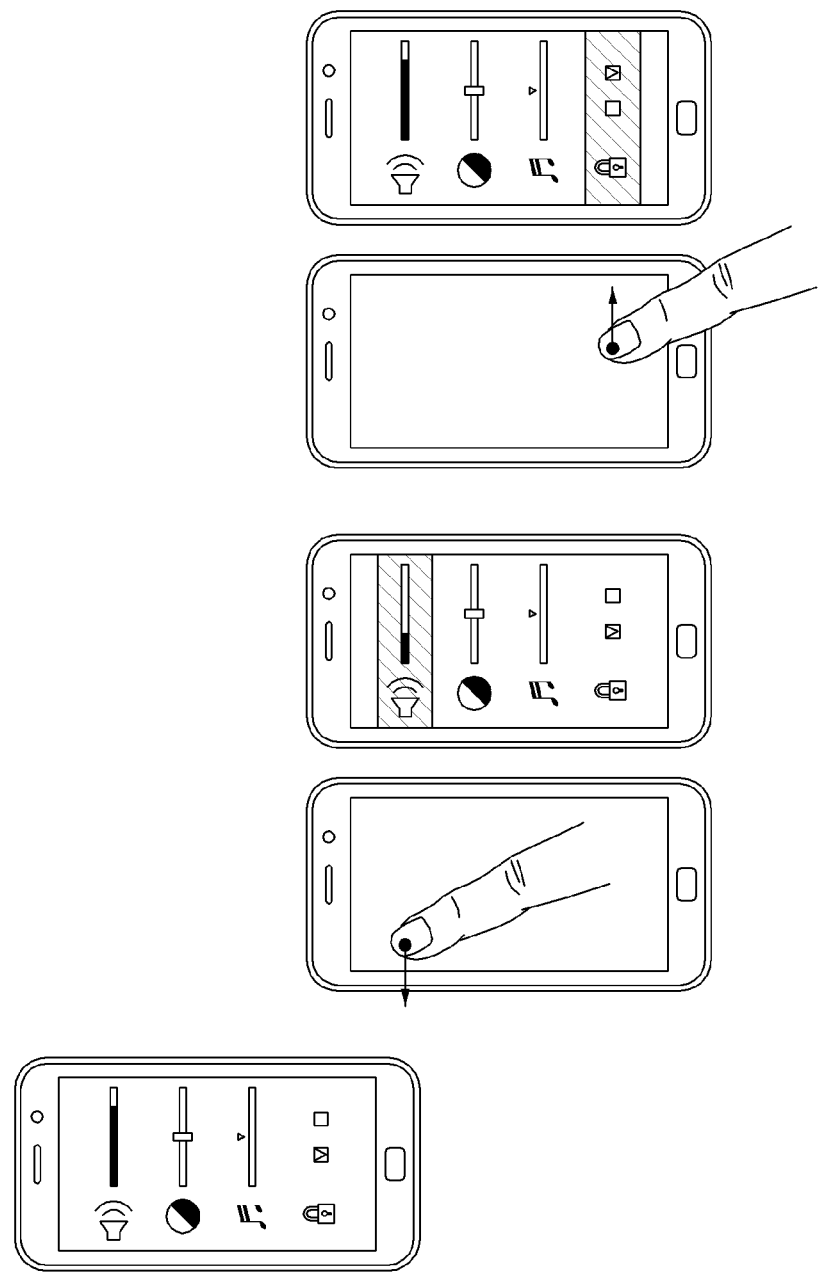
FIG. 50 illustrates an example of selecting and controlling a predetermined target, according to one or more embodiments.

FIG. 50 illustrates an example of selecting and controlling a predetermined target, according to one or more embodiments.

Referring to FIG. 50, when the direction of force is a right direction as an analysis result of force input information, the interface controlling apparatus may control a content control command corresponding to "right" to be executed with respect to the selected target in operation 4960.

When the direction of force is a left direction as an analysis result of force input information, the interface controlling apparatus may control a content control command corresponding to "left" to be executed with respect to the selected target in operation 4980.

Figure 51:
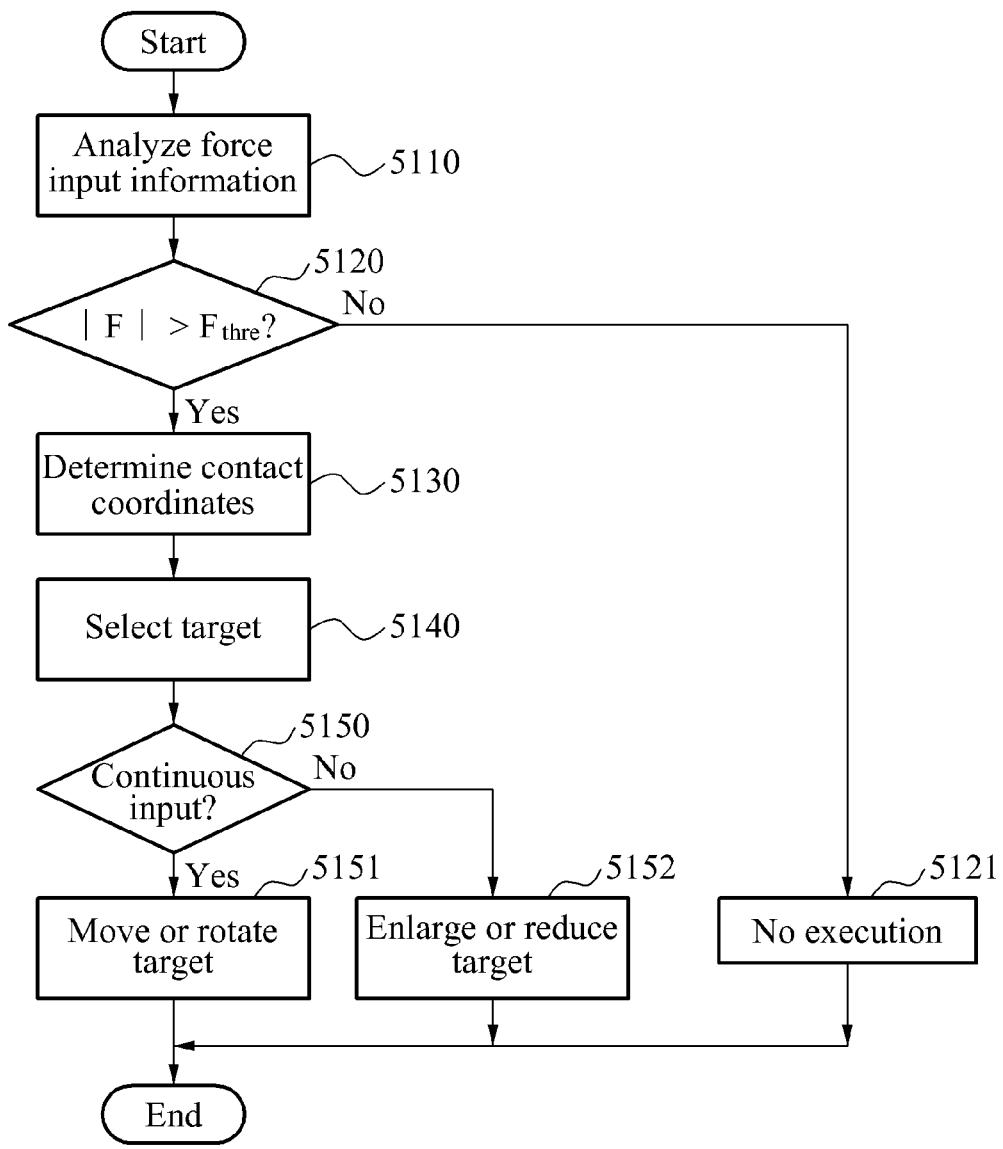
FIG. 51 illustrates a method of selecting and controlling a predetermined item, according to one or more embodiments.

FIG. 51 illustrates a method of selecting and controlling a predetermined item, according to one or more embodiments.

Referring to FIG. 51, the interface controlling apparatus may analyze force input information in operation 5110, and may determine whether an absolute force value |F| with respect to a magnitude of force is greater than a predetermined force value $F_{thre}$ in operation 5120. When the absolute force value |F| is less than $F_{thre}$, the interface controlling apparatus may determine that the input force is not an intended input, and thus, may not execute the content control in operation 5121.

The interface controlling apparatus may determine contact coordinates by analyzing the received contact input information in operation 5130, and may determine a target of content corresponding to the contact coordinates in operation 5140.

Depending on embodiments, the interface controlling apparatus may generate the content control information based on the force input information with at least one of the acceleration information, the angular velocity information, and the geomagnetic information, may move a target of the content based on at least one of the acceleration information, the angular velocity information, and the geomagnetic information, and may change a size of the target based on the force input information, as only examples.

Hereinafter, a method of FIG. 51 will be further described with reference to FIGS. 52 and 53, according to one or more embodiments.

Figure 52:
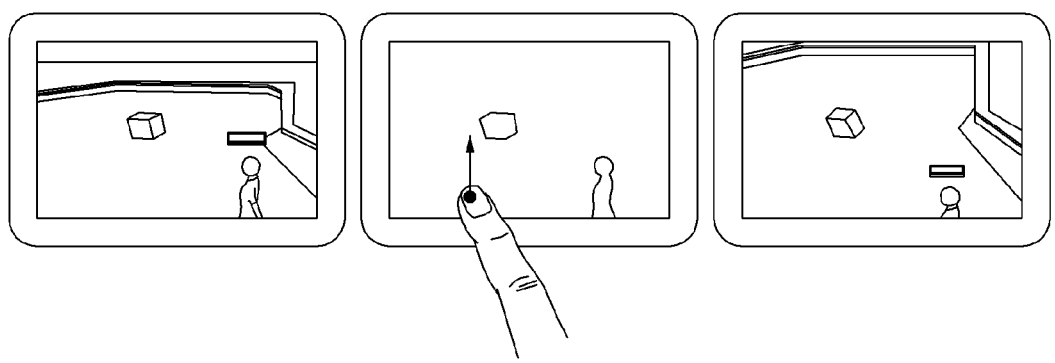
FIG. 52 and FIG. 53 illustrate examples of selecting and controlling a predetermined item, according to one or more embodiments.
Figure 53:
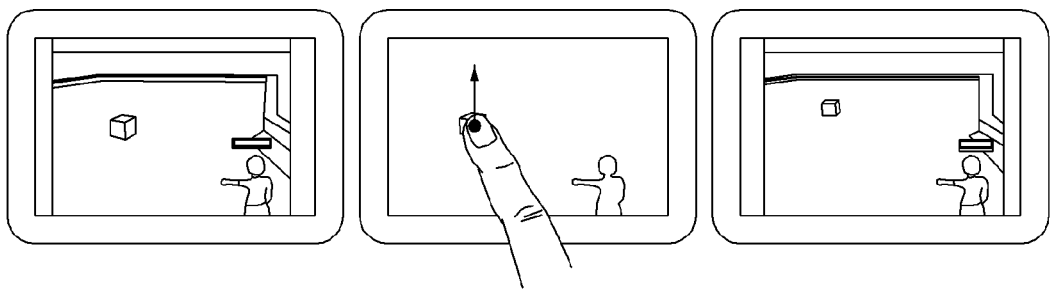

FIG. 52 and FIG. 53 illustrate examples of selecting and controlling a predetermined item, according to one or more embodiments.

Referring to FIG. 52, in one or more embodiments, in operation 5150 the interface controlling apparatus may determine whether the force input information corresponds to the continuous input. When the force input information corresponds to the continuous input as an analysis result of force input information, the interface controlling apparatus may move or rotate the selected target in operation 5151. The interface controlling apparatus may determine that a background of content is selected based on contact input information and may change a direction of a global view of content based on force input information.

Referring to FIG. 53, in one or more embodiments, the interface controlling apparatus may determine that a box of content is selected based on contact input information and may change a position of the box based on force input information.

When the force input information does not correspond to the continuous input as an analysis result of force input information, the interface controlling apparatus may, for example, enlarge or reduce the selected target in operation 5152.

Figure 54:
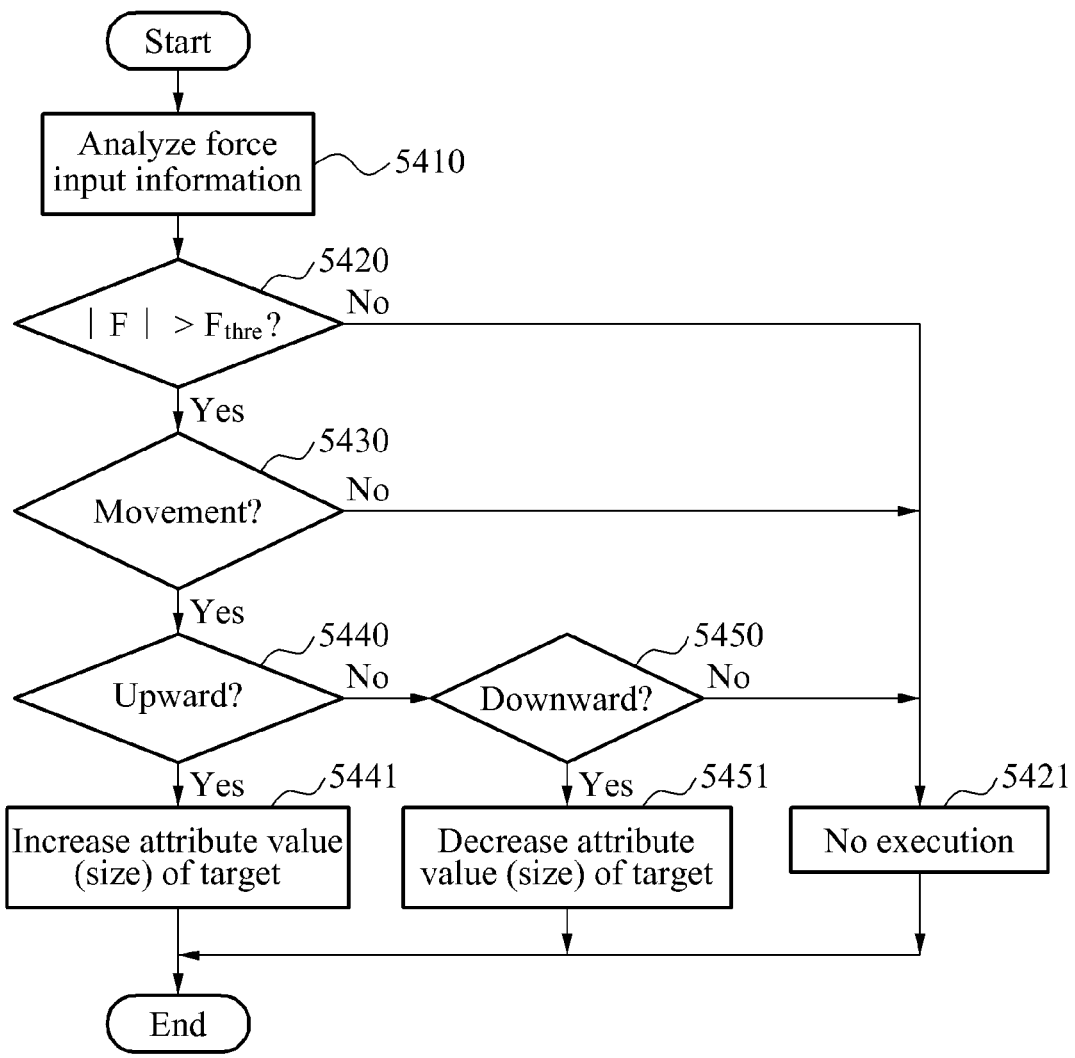
FIG. 54 illustrates a method of using force input information with additional information to control content, according to one or more embodiments.

FIG. 54 illustrates a method of using force input information with additional information to control content, according to one or more embodiments.

Referring to FIG. 54, the interface controlling apparatus may analyze force input information in operation 5410, and may determine whether an absolute force value |F| with respect to a magnitude of force is greater than a predetermined force value $F_{thre}$ in operation 5420. When the absolute force value |F| is less than $F_{thre}$, the interface controlling apparatus may determine that the input force is not an intended input and thus, may not execute the content control in operation 5421.

In operation 5430, the interface controlling apparatus may determine whether a movement of a main body is detected by analyzing received other input information. When no movement of the main body is detected, the interface controlling apparatus may not execute the content control in operation 5421.

Depending on embodiments, the interface controlling apparatus may generate the content control information based on the force input information and at least one of the acceleration information, the angular velocity information, and the geomagnetic information, may move a target of the content based on at least one of the acceleration information, the angular velocity information, and the geomagnetic information, and may change a size of the target based on the force input information, as only examples.

Hereinafter, a method of FIG. 54 will be further described with reference to FIG. 55, according to one or more embodiments.

Figure 55:
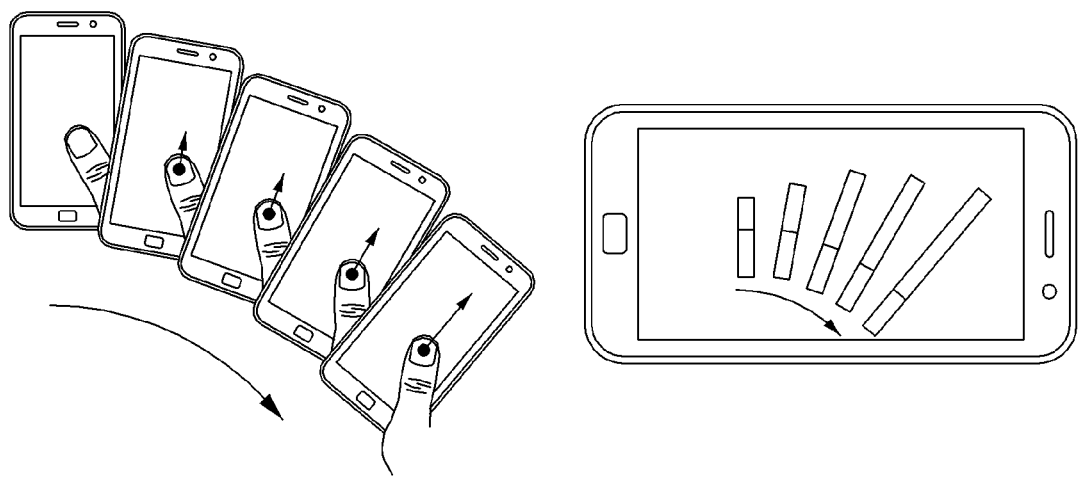
FIG. 55 illustrates an example of using force input information with additional information to control content, according to one or more embodiments.

FIG. 55 illustrates an example of using a force input information with additional information to control content, according to one or more embodiments.

Referring to FIG. 55, in operations 5440 and 5450, the interface controlling apparatus may determine whether the direction of force is an upward direction or downward direction by analyzing the force input information. As an analysis result of force input information, when the movement of the main body is detected and when the direction of force is an upward direction, the interface controlling apparatus may increase an attribute value of a target, for example, a size of the target in operation 5441. For example, the interface controlling apparatus may control, or influence, a display of the target by tilting the target along the movement of the main body and enlarging the size of the target.

As an analysis result of force input information, when the movement of the main body is detected and when the direction of force is a downward direction, the interface controlling apparatus may decrease an attribute value of the target, for example, a size of the target in operation 5451. For example, the interface controlling apparatus may control, or influence, a display of the target by tilting the target along the movement of the main body and reducing the size of the target.

Depending on embodiments, as an analysis result of force input information, when the main body is tilted towards a left direction and when the direction of force is a downward direction, the interface controlling apparatus may tilt the target towards left and reduce the size of the target. As an analysis result of force input information, when the main body is tilted towards the left and when the direction of force is an upward direction, the interface controlling apparatus may tilt the target towards the left and enlarge the size of the target.

Figure 56:
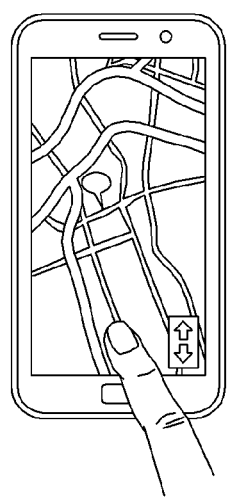
FIG. 56 and FIG. 57 illustrate examples of a device including an interface controlling apparatus, according to one or more embodiments.
Figure 57:
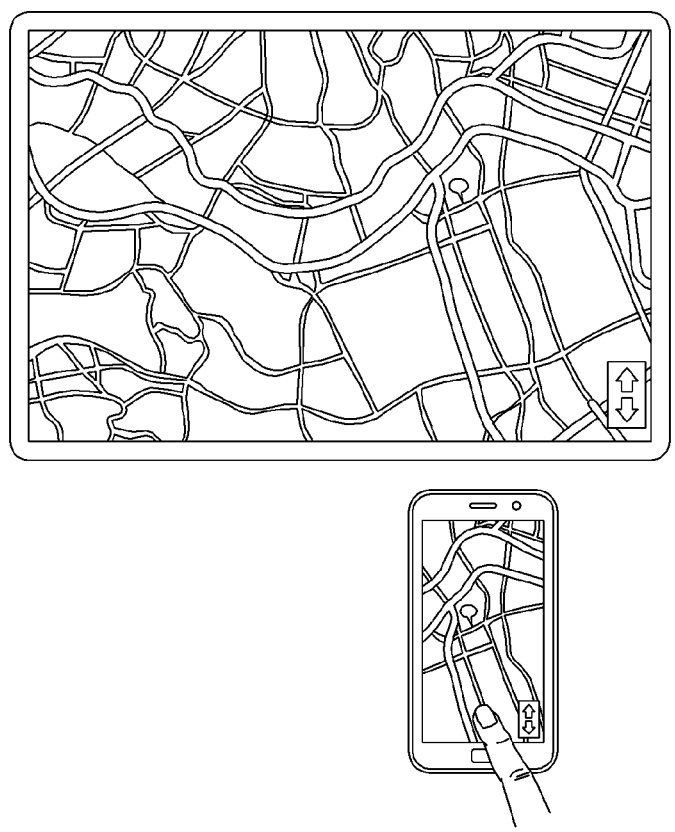

FIG. 56 and FIG. 57 illustrate examples of a system with a display unit and an interface controlling apparatus, according to one or more embodiments.

Referring to FIG. 56, the interface controlling apparatus may be provided in a form of a touch screen or a touch pad, and may include the display unit to display content and receive force input information from a pointing object, as only examples.

Referring to FIG. 57, it is possible to control content that is displayed on a remote display unit, i.e., separate from the example touch screen or touch pad, using the interface controlling apparatus. For example, content may be controlled to be displayed alike on the remote display unit based on force input information that is received by the interface controlling apparatus from the pointing object.

As only examples, the pointing object may be one of a finger, a touch input pen, and an input button, for example, a home button of a mobile communication terminal, including at least one key for a direction a direction input, noting that alternatives are also available. Accordingly, the pointing object may include any configuration capable of generating force input information corresponding to a position of content or a control command with respect to the content.

Accordingly, referring to FIG. 4, the contact unit 410 of the interface controlling apparatus, according to one or more embodiments, may be inserted into a lower portion of a display unit of the touch screen or the touch pad, may be inserted into a lower portion of a force input key or a force input button for force input, such as a home button of a mobile device, for example, or may be inserted into an integrated or divided Qwerty keyboard, as only examples.

Figure 58:
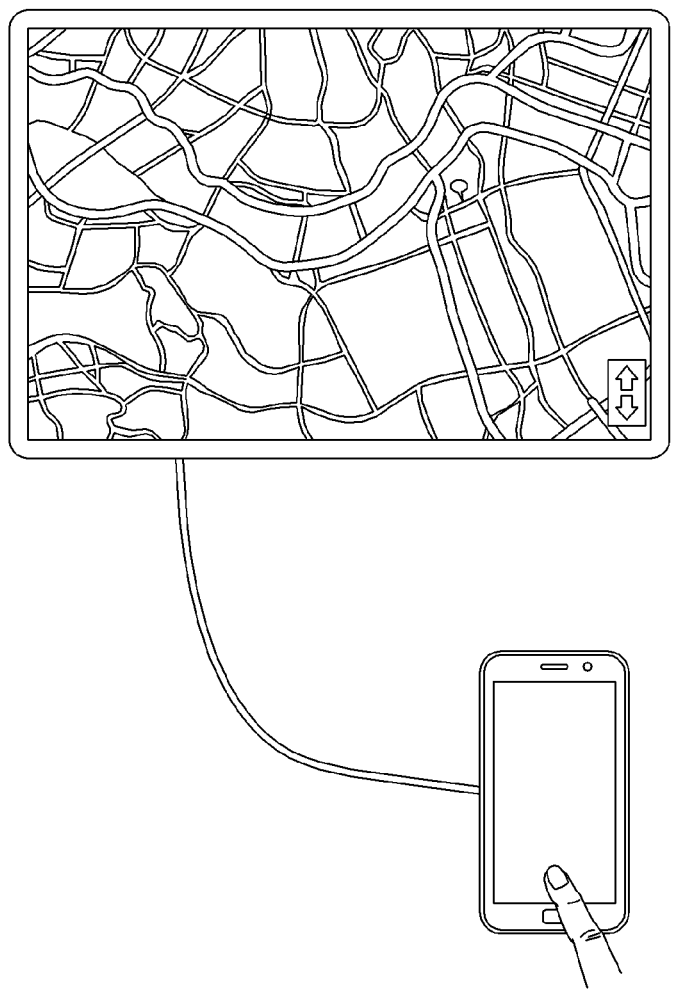
FIG. 58 and FIG. 59 illustrate examples of controlling content displayed using a display unit separate from an interface controlling apparatus and positioned in a remote position, according to one or more embodiments.
Figure 59:
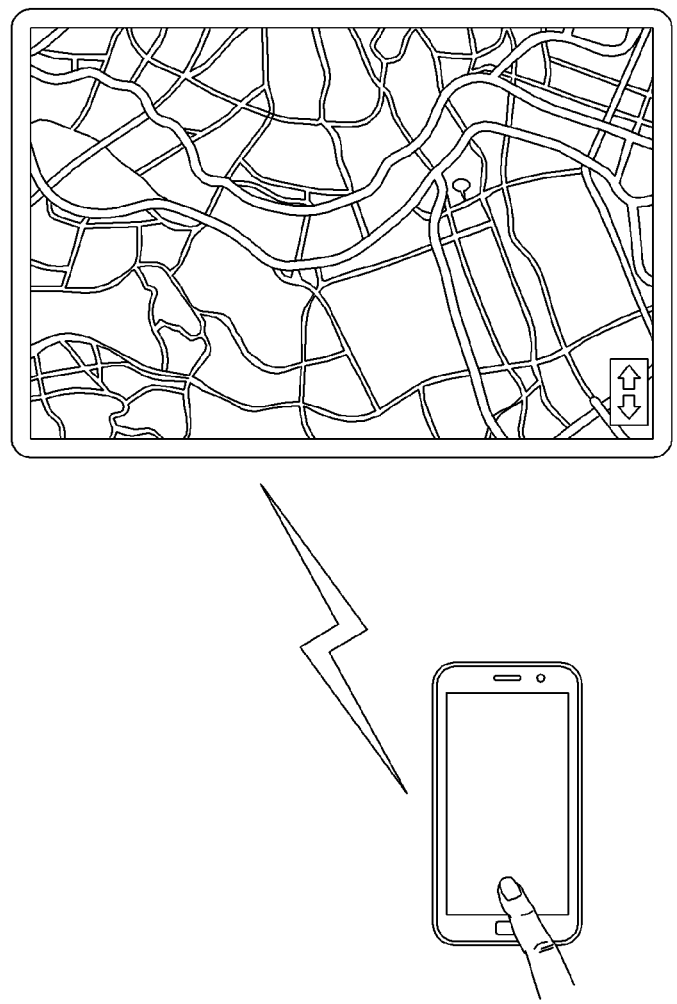

FIGS. 58 and 59 illustrate examples of controlling content displayed using a remote display unit separate from an interface controlling apparatus and positioned in a remote position, according to one or more embodiments.

Referring to FIGS. 58 and 59, content that is connected to the interface controlling apparatus in a wired or wireless manner, for example, and is displayed on the remote display unit separate from the interface controlling apparatus may be controlled using the interface controlling apparatus, e.g., with or without a displaying of content at the interface controlling apparatus, such as selectively not displaying content when the interface controlling apparatus includes a display and not displaying content at the interface controlling apparatus because the interface controlling apparatus does not include a display capability. Accordingly, it is possible to remove spatial constraints in receiving an interface control signal.

Also, using the interface controlling apparatus, it is possible to enhance convenience in continuously inputting information, to reduce movement load for inputting information, and to enhance security without exposing input information to other persons.

Hereinafter, examples of a device that may include the interface controlling apparatus, according to one or more embodiments, will be further described with reference to FIG. 60 through FIG. 64.

Figure 60:
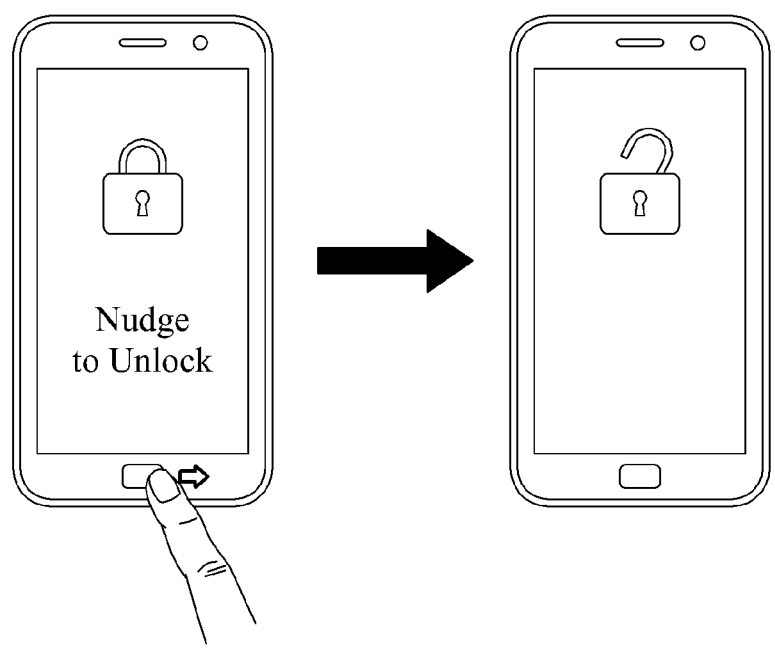
FIG. 60 illustrates an example of an interface controlling apparatus configured using a force input key or a button scheme, according to one or more embodiments.

FIG. 60 illustrates an example of an interface controlling apparatus configured using a force input key or a button scheme, according to one or more embodiments.

The interface controlling apparatus may be configured as a key or a button that enables force input, and may also be configured as a home button whose activation may control, or influence, a mobile communication terminal or a remote controller to move the displayed content to a predetermined front page or screen used in the mobile communication terminal and/or a remote controller.

The interface controlling apparatus may receive, from a pointing object, for example, a finger, force input information associated with at least one force that acts in at least one direction with respect to a force input key or a force input button, and may control or initiate the corresponding system to perform a predetermined operation based on the force input information.

Referring to FIG. 60, the interface controlling apparatus configured as the force input key or the force input button may generate content control information used to release a "screen lock state", i.e., a state in which one or more capabilities of the corresponding system are not enabled or a user is blocked from accessing or controlling such capabilities, by analyzing force input information that is received from the pointing object in a predetermined direction during at least a predetermined period of time, and may release the screen lock state of a terminal based on the content control information, i.e., the release of the screen lock state may enable such capabilities of the corresponding system or enable a user to access or control such capabilities.

Even though force input information associated with a force input from an upward direction may be assumed in FIG. 60, as only an example, the interface controlling apparatus may be configured using a passcode scheme. As only an example, the passcode scheme may include a predetermined directional pattern or sequence of applied force in order to release the screen lock state, e.g., the directional pattern may be represented by the direction of the applied force changing one or more predetermined times during application of the force.

In one or more embodiments, the interface controlling apparatus may replace a drag event scheme of at least a predetermined length based on a touch input on a screen of a conventional terminal.

Figure 61:
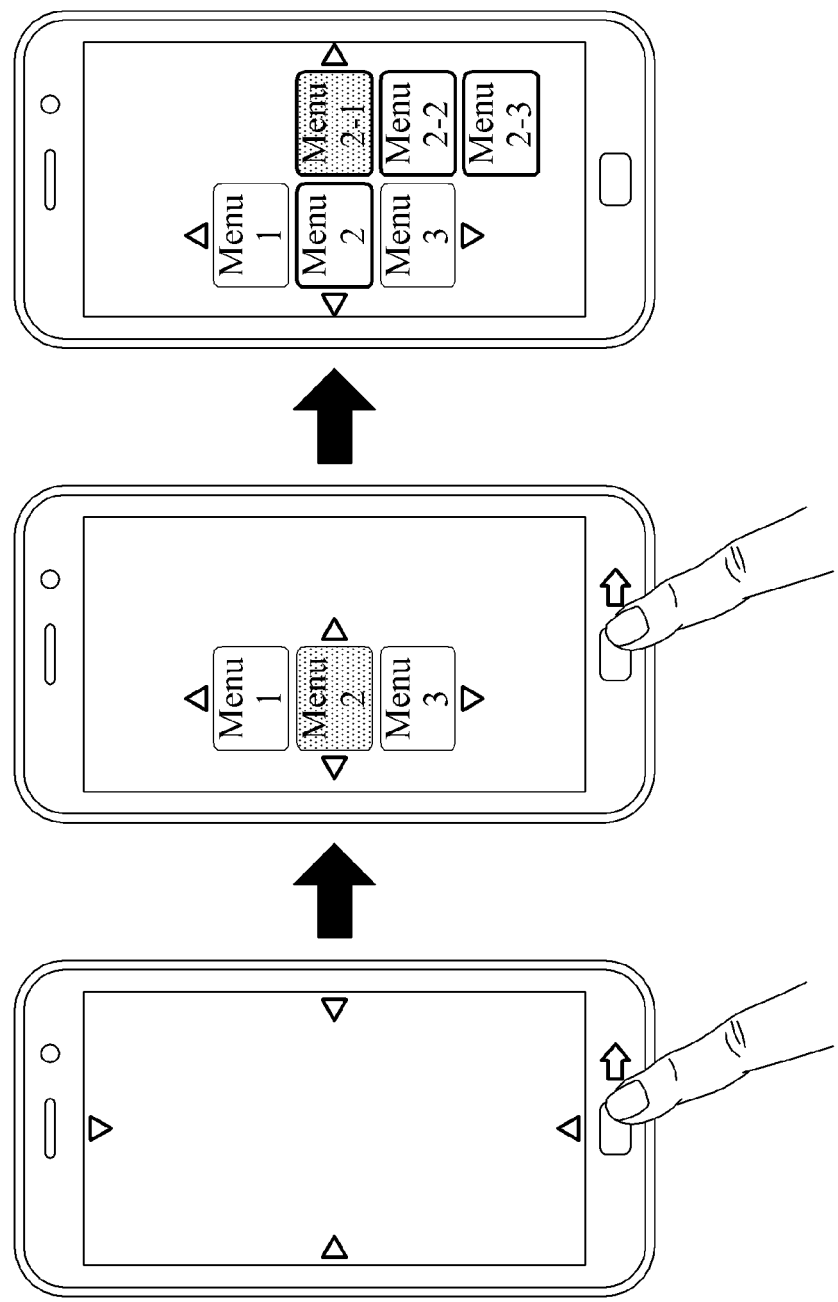
FIG. 61 and FIG. 62 illustrate examples of controlling a menu widget, according to one or more embodiments.
Figure 62:
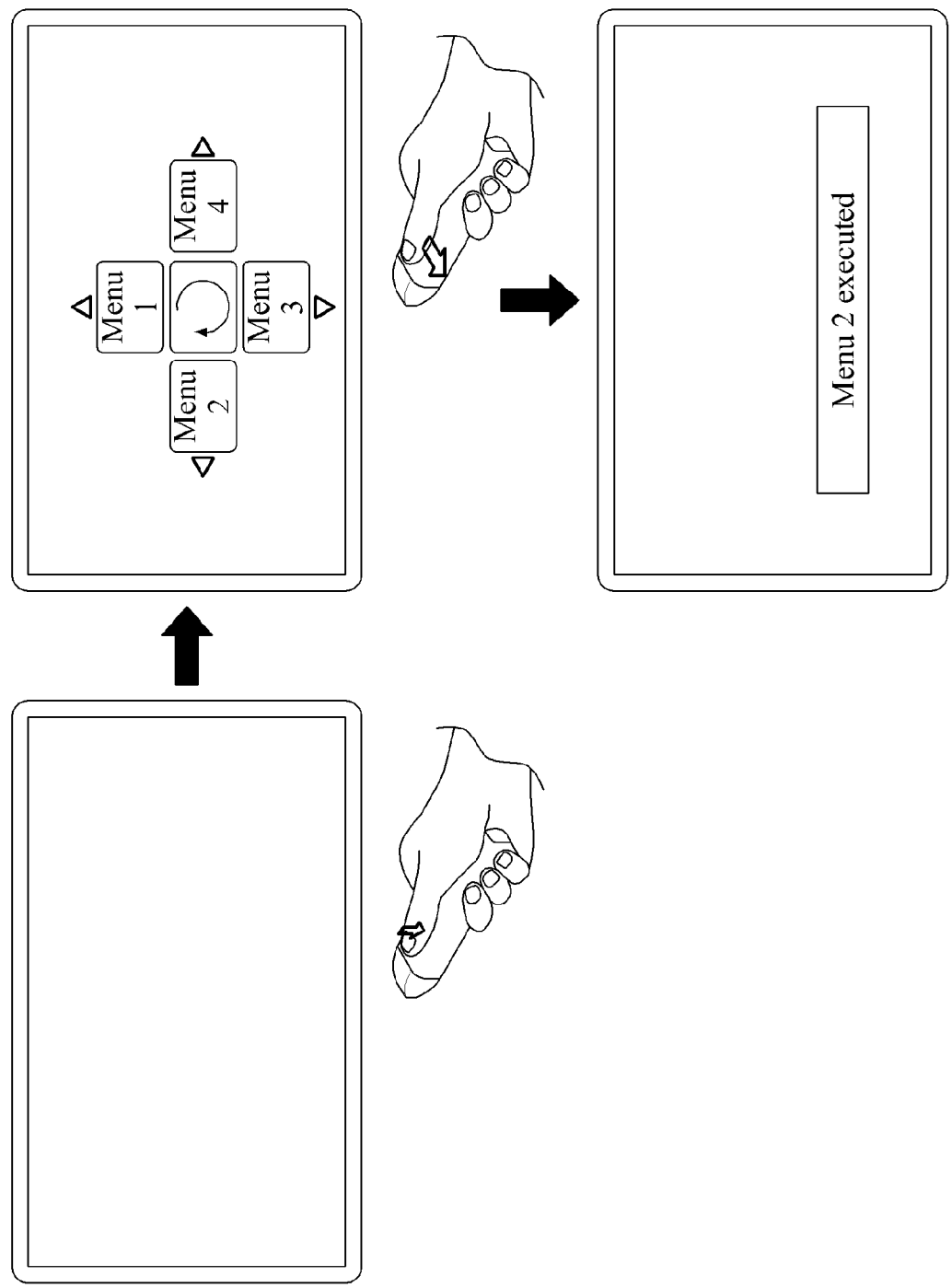

FIG. 61 and FIG. 62 illustrate examples of controlling a menu widget, according to one or more embodiments.

Referring to FIG. 61, the interface controlling apparatus may be configured as a force input key or a force input button that enables a force input, and may generate content control information associated with a menu, e.g., a menu or list image, object, or widget, activated on a screen area of a display unit by analyzing force input information that is received by the force input key or the force input button from the pointing object, and may control traversal of the menu based on the generated content control information.

Referring to FIG. 61, using the interface controlling apparatus, as only an example, a menu may be selected based on force input information that is input to the force input key or the force input button with respect to a menu widget activated on the screen area of the display unit. The selected menu may be traversed and menu items selected or executed.

In an example, the interface controlling apparatus may receive a force input of a 2D horizontal direction from the pointing object, for example, a finger, based on a position of the menu, and may also receive a force input of a vertical direction.

Depending on embodiments, the interface controlling apparatus for controlling a menu widget, for example, may be configured as a force input key or a force input button of FIG. 62. Also, the interface controlling apparatus may be applied to a pointing apparatus such as a remote controller, for example, to adjust a volume, to change a channel, or to control content of a VOD selection. For the above operation, the pointing apparatus may include a communication apparatus that is configured to transmit, to the display unit, content control information used to control the menu widget. The display unit may include the communication apparatus to receive the content control information.

Also, in one or more embodiments, the interface controlling apparatus may generate content control information based on force input information, and may transmit the generated content control information to the display unit. The display unit may include a separate content controller that may receive the content control information from the interface controlling apparatus through a communication apparatus, and may control the content based on the received content controller. Alternatively, the interface controlling apparatus may be combined with a local display unit that includes such a content controller that controls the display of content on the local display, and the remote display may merely be transmitted the content control information or transmitted the results of the content controller, e.g., to display content information available at the combined interface controlling apparatus and local display.

Figure 63:
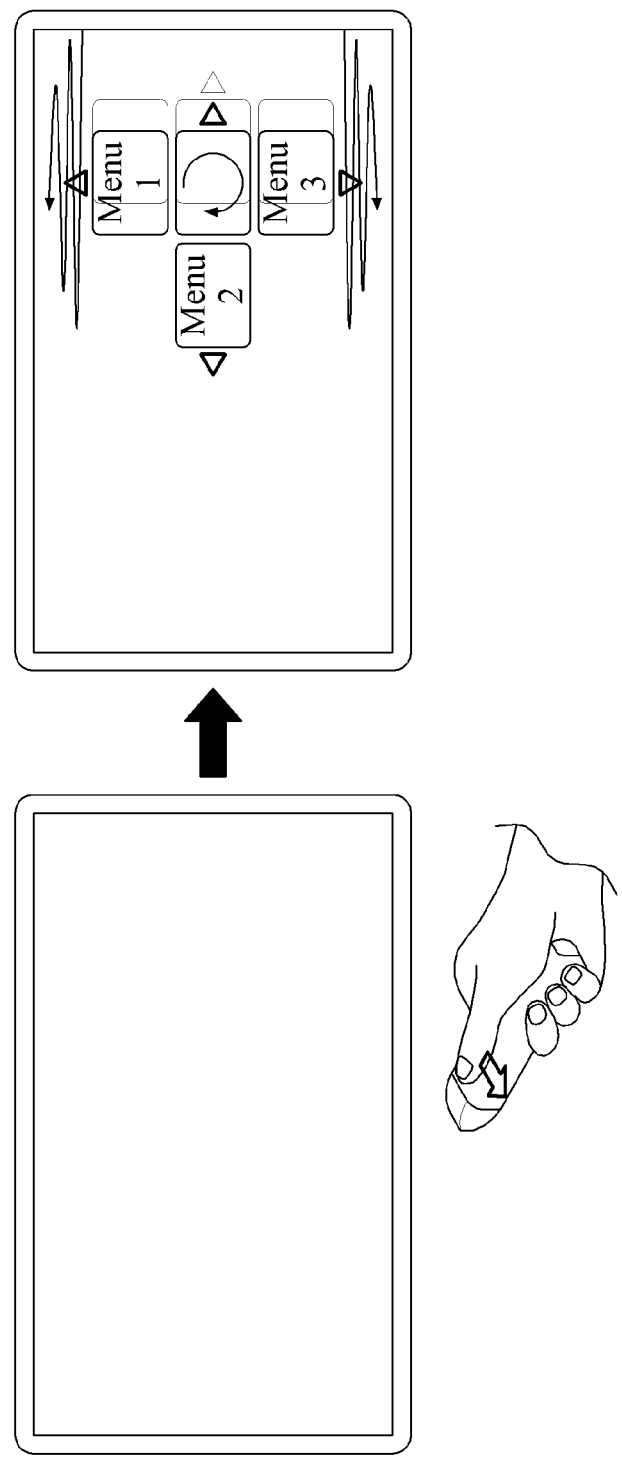
FIG. 63 and FIG. 64 illustrate examples of feedback provided in response to controlling of a menu widget, according to one or more embodiments.
Figure 64:
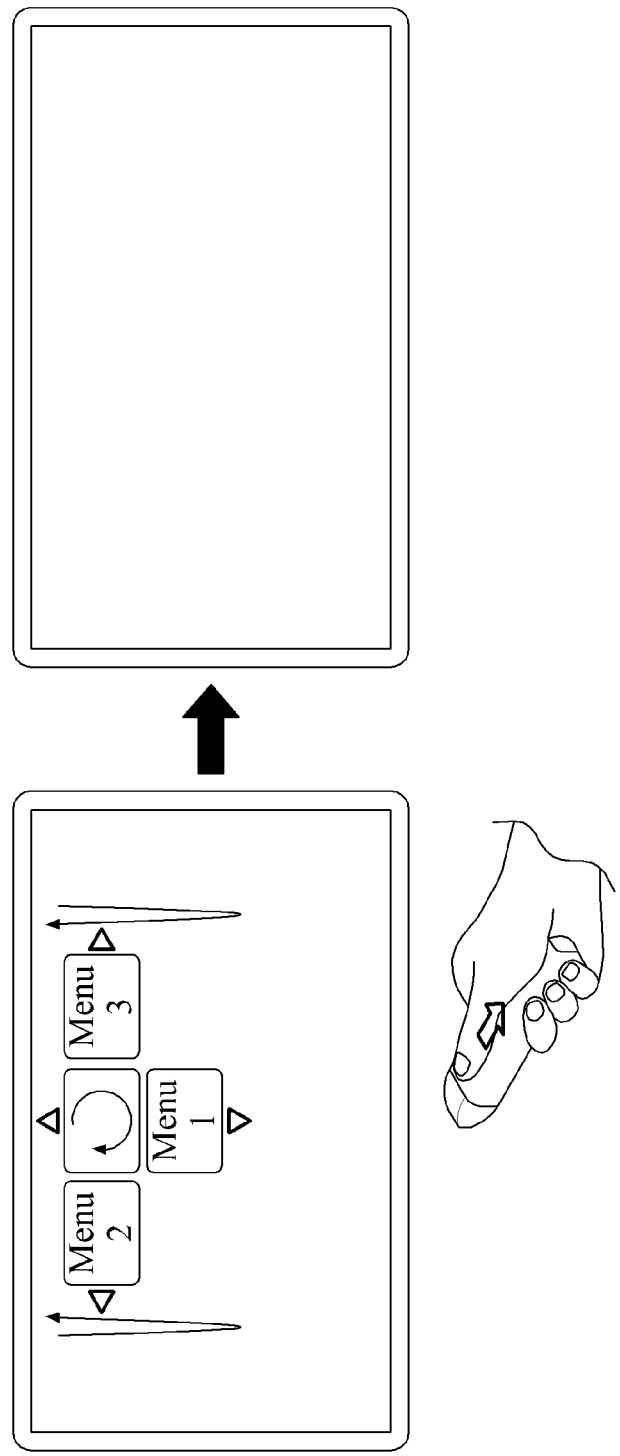

FIG. 63 and FIG. 64, according to one or more embodiments, illustrate feedback provided in response to a controlling of a menu widget, as only an example.

The interface controlling apparatus may be configured to provide visual feedback according to control of an activated menu widget. For example, the visual feedback may include visually displaying momentum of the traversal through the menu or an oscillating with respect to the menu widget based on the force input.

The interface controlling apparatus may be configured to provide visual feedback in which the menu widget is displayed with elasticity, e.g., restoring to an initial position after having been moved, in response to input of force into a predetermined direction as illustrated in FIG. 63. For example, the interface controlling apparatus may be configured to provide visual feedback in which the menu widget fixed at a predetermined position is dragged in response to the input of force into the predetermined direction and then is restored, e.g., automatically, to the fixed position again at a point in time when the force input is terminated as illustrated in FIG. 64.

According to one or more embodiments, the interface controlling apparatus may provide a user with visual feedback or tactile feedback occurring due to a reaction of force applied by the user. Therefore, the user may immediately recognize whether the input is successful.

According to one or more embodiments, the interface controlling apparatus may accurately determine whether a user intended an input and readily recognize a start and an end of the input.

According to one or more embodiments, it is possible to control an interface based on force input information. Therefore, it is possible to remove constraints on an input space and to enhance the convenience of continuous input.

Depending on embodiment, apparatuses, systems, and units descriptions herein may respectively include one or more hardware devices or hardware processing elements. For example, in one or more embodiments, any described apparatus, system, and unit may further include one or more desirable memories, and any desired hardware input/output transmission devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented by at least one processing device, such as a processor or computer. Further to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device. The processing element may be a specially designed computing device to implement one or more of the embodiments described herein.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An interface controlling system, the system comprising:
   a contact unit configured to receive a lateral force input information relative to a contact surface of the contact unit;
   a base disposed on one surface of the contact unit;
   a sensing unit including a force sensor configured to measure the lateral force input information received from the contact unit, wherein the force sensor is laterally disposed between the contact unit and the base; and
   a content controller configured to generate content control information by analyzing the measured lateral force input information, and to control content, for provision to a user, based on the generated content control information,
   wherein an elastic substance is laterally disposed between the force sensor and at least one of the contact unit or the base.

2. The system of claim 1, wherein the analyzing of the measured lateral force input information includes analyzing a direction of the lateral force input information.

3. The system of claim 1, wherein a first side of the force sensor faces a lateral side of the contact unit.

4. The system of claim 3, wherein a second side of force sensor faces the base.

5. The system of claim 1, wherein the elastic substance is disposed between the contact unit and the force sensor to transfer, to the force sensor, the lateral force input information received from the contact unit.

6. The system of claim 1, further comprising a feedback layer disposed between the support layer and the sensor layer, the feedback layer comprising a feedback provider configured to generate feedback based on the lateral force input information.

7. The system of claim 6, wherein the feedback provider generates the feedback based upon a determined relationship between the lateral force input information and the controlling of the content by the content controller.

8. The system of claim 1, wherein the force sensor is disposed in an opening that is formed between the base and the contact unit, so as to be formed along the circumference of the contact unit.

9. The system of claim 8, wherein the contact unit or the base are formed to have one of an oval shape, an elliptical shape, and a polygonal shape.

10. The system of claim 9, wherein the force sensor is arranged based on one of a continuous arrangement pattern and a discontinuous arrangement pattern.

11. The system of claim 1, wherein the contact unit and the force sensor are combined into an integrated mixed layer.

12. The system of claim 11, wherein the base has a surface having an uneven portion; and
   the integrated mixed layer comprises the force sensor disposed sequentially with the contact unit on the uneven portion of the base.

13. An interface controlling system, the system comprising:
   a contact unit;
   an information receiver configured to receive, from a force sensor, a lateral force input information relative to a contact surface of the system and associated with an input force,
   wherein the force sensor is laterally disposed between the contact surface and a base, and
   wherein the base is disposed on one surface of the contact unit;
   an information analyzer configured to generate content control information by analyzing the lateral force input information; and
   a content controller configured to control content based on the content control information,
   wherein an elastic substance is laterally disposed between the force sensor and at least one of the contact unit or the base.

14. The system of claim 13, further comprising plural force sensors to generate the lateral force input information, wherein the information analyzer generates the content control information by analyzing a direction of the lateral force input information.

15. The system of claim 13, wherein the information analyzer determines whether the lateral force input information is greater than a reference value set to control the content, and generates the content control information when the lateral force input information is greater than the reference value.

16. The system of claim 13, wherein
   the information analyzer generates the content control information used to determine a scroll direction of a visible area of the content based on the lateral force input information, and
   the content controller scrolls the visible area of the content based on the content control information.

17. The system of claim 13, wherein
   the information analyzer generates the content control information used to control a visible area of the content to be enlarged or reduced based on a combination of the lateral force input information, and the content controller enlarges or reduces the visible area of the content based on the content control information.

18. The system of claim 17, wherein the information analyzer determines an enlargement rate or a reduction rate of the visible area based on a magnitude of force of the lateral force input information, and generates the content control information to control the visible area of the content to be enlarged or reduced based on the determined rate.

19. The system of claim 13, wherein
the information analyzer generates the content control information used to determine a selection area with respect to a menu, a folder, or a file of the content based on the lateral force input information, and
the content controller determines the selection area with respect to the menu, the folder, or the file of the content based on the content control information.

20. The system of claim 13, wherein
the information analyzer generates the content control information used to determine an upper area or a lower area with respect to a menu, a folder, or a file of the content based on a combination of the lateral force input information, and
the content controller determines the upper area or the lower area with respect to the menu, the folder, or the file of the content based on the content control information.

21. The system of claim 13, wherein
the information analyzer generates the content control information used to determine a search direction or a search section with respect to multimedia of the content based on the lateral force input information, and
the content controller determines the search direction or the search section with respect to the multimedia of the content based on the content control information.

22. The system of claim 13, wherein
the information analyzer generates the content control information used to determine a previous file or a subsequent file with respect to multimedia of the content based on a combination of the lateral force input information, and
the content controller determines the previous file or the subsequent file with respect to the multimedia of the content based on the content control information.

23. The system of claim 13, wherein
the information analyzer generates the content control information used to determine a page turning direction with respect to multimedia of the content based on the lateral force input information, and
the content controller determines the page turning direction with respect to the multimedia of the content based on the content control information.

24. The system of claim 13, wherein
the information analyzer generates the content control information used to control a front page or a last page of the content to be displayed based on a combination of the lateral force input information, and
the content controller controls the front page or the last page of the content to be displayed based on the content control information.

25. The system of claim 13, wherein
the information receiver receives another item of input information, and
the information analyzer generates the content control information based on the lateral force input information and the other item of input information.

26. The system of claim 25, wherein the other item of input information comprises at least one of contact input information, acceleration information, angular velocity information, and geomagnetic information.

27. The system of claim 26, wherein
the information analyzer generates the content control information based on the lateral force input information and the contact input information, and
the content controller determines a target of the content based on the contact input information and controls the determined target based on the lateral force input information.

28. The system of claim 26, wherein
the information analyzer generates the content control information based on the lateral force input information and at least one of the acceleration information, the angular velocity information, and the geomagnetic information, and
the content controller moves a target of the content based on at least one of the acceleration information, the angular velocity information, and the geomagnetic information, and changes a size of the target based on the lateral force input information.

29. The system of claim 13, wherein the lateral force input information comprises at least one of an action point of force that is input to the force sensor, a direction of force, a magnitude of force, and a time duration of force.

30. The system of claim 13, wherein the information receiver, information analyzer, and content controller are collectively configured in an application processor distinct from one or more integrated circuits that make up a sensing unit that comprises the force sensor.

31. The system of claim 13, wherein the force sensor is in a sensor layer formed on a support layer, along with a contact layer and a base layer being formed on the support layer, with the contact unit being configured for receiving the lateral force and a perpendicular force corresponding to the input force.

32. The system of claim 31, wherein the sensor layer and the contact unit are formed in a same layer area above the base layer.

33. The system of claim 31, wherein the sensor layer and the base layer are formed in a same layer area below the contact unit.

34. The system of claim 33, wherein a feedback provision layer is formed between the support layer and the base layer, the feedback provision layer providing haptic feedback based upon the input force.

35. The system of claim 33, wherein a buffer layer is formed between the contact layer and the base layer.

36. The system of claim 33, wherein an unlocking of content, enabling content to be accessed that is not enabled for access when the content is locked, is based upon a sequence of distinctly detected directions of lateral force input information matching an unlocking sequence.

37. The system of claim 36, wherein the force sensor is formed as a home button of a mobile device of the system.

38. The system of claim 13, wherein a traversal of a menu, as the content, and selection of a menu item of the menu is performed based upon one or more distinctly detected directions of lateral force input information.

39. The system of claim 38, wherein the force sensor is formed as a home button of a mobile device of the system.

40. The system of claim 38, where the force sensor is included in a remote controller device distinct from a device, of the system, that comprises the content controller.

41. The system of claim 40, wherein the device of the system that includes the content controller is a display unit.

42. The system of claim 38, wherein a movement of the menu or menu item on a display is elastic, such that after a movement of the menu or menu item, based on the one or more distinctly detected directions, the menu or menu item elastically returns to an original position where the menu or menu item was before the movement of the menu or menu item.

43. An interface controlling system, comprising:
- a contact unit configured to receive lateral force input information relative to a contact surface of the contact unit;
- a base disposed on one surface of the contact unit;
- a sensing unit disposed along one lateral surface of the contact unit, and provided with a force sensor configured to measure the lateral force input information received from the contact unit, wherein the force sensor extends along an entire length of the lateral surface of the contact unit and is laterally disposed between the contact unit and the base; and
- a content controller configured to generate content control information by analyzing a direction of the measured lateral force input information, and to control content based on the content control information,
- wherein an elastic substance is laterally disposed between the force sensor and at least one of the contact unit or the base.

44. The system of claim 43, wherein the force sensor is disposed on the base, which is disposed below the contact unit.

45. The system of claim 43, wherein the elastic substance is disposed between the force sensor and the contact unit to transfer, to the force sensor, the lateral force input information received from the contact unit.

46. An interface controlling method, the method comprising:
- receiving, from a force sensor, a force input information associated with input force that is applied to a contact surface of a contact unit, the force input information being a lateral force input information relative to the contact surface,
- wherein the force sensor is laterally disposed between the contact unit and a base,
- wherein the base is disposed on one surface of the contact unit, and
- wherein an elastic substance is laterally disposed between the force sensor and at least one of the contact unit or the base;
- generating content control information by analyzing the lateral force input information; and
- controlling content based on the content control information.

47. The method of claim 46, wherein the analyzing of the lateral force input information comprises analyzing a direction of the lateral force input information.

48. The method of claim 46, wherein the generating comprises:
- determining whether the lateral force input information has a magnitude that is greater than a reference value set, the reference value being input force value that represents an intended force input has been made to control the content; and
- generating the content control information when the lateral force input information is greater than the reference value.

49. A non-transitory computer-readable recording medium comprising computer readable code to control a processing device configured to implement the method of claim 46.

* * * * *